(12) United States Patent
Thompson et al.

(10) Patent No.: US 10,139,550 B2
(45) Date of Patent: Nov. 27, 2018

(54) VARIABLE INDEX LIGHT EXTRACTION LAYER AND METHOD OF MAKING THE SAME

(71) Applicant: 3M INNOVATIVE PROPERTIES COMPANY, St. Paul, MN (US)

(72) Inventors: David Scott Thompson, West Lakeland, MN (US); Shawn C. Dodds, Saint Paul, MN (US); Mikhail L. Pekurovsky, Bloomington, MN (US); Kevin R. Schaffer, Woodbury, MN (US); Matthew S. Stay, Minneapolis, MN (US); Steven D. Solomonson, Shoreview, MN (US); John A. Wheatley, Lake Elmo, MN (US); Zhaohui Yang, North Oaks, MN (US); Joseph W. Woody, V, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 181 days.

(21) Appl. No.: 14/423,654

(22) PCT Filed: Aug. 21, 2013

(86) PCT No.: PCT/US2013/055954
§ 371 (c)(1),
(2) Date: Feb. 24, 2015

(87) PCT Pub. No.: WO2014/031726
PCT Pub. Date: Feb. 27, 2014

(65) Prior Publication Data
US 2015/0192728 A1 Jul. 9, 2015

Related U.S. Application Data

(60) Provisional application No. 61/692,753, filed on Aug. 24, 2012.

(51) Int. Cl.
*F21V 8/00* (2006.01)

(52) U.S. Cl.
CPC ......... *G02B 6/0063* (2013.01); *G02B 6/0005* (2013.01); *G02B 6/005* (2013.01);
(Continued)

(58) Field of Classification Search
CPC .. G02B 6/0063; G02B 6/0051; G02B 6/0055; G02B 6/0065; G02B 6/0043; G02B 6/005; G02B 6/006
See application file for complete search history.

(56) References Cited

U.S. PATENT DOCUMENTS

| 3,718,712 A | 2/1973 | Tushaus |
| 4,373,282 A | 2/1983 | Wragg |

(Continued)

FOREIGN PATENT DOCUMENTS

| WO | WO 1997-36131 | 10/1997 |
| WO | WO 01/27529 A1 | 4/2001 |

(Continued)

OTHER PUBLICATIONS

International Search Report for PCT Application No. PCT/US2013/055954, dated Nov. 27, 2013, 4 pages.

*Primary Examiner* — Karabi Guharay
(74) *Attorney, Agent, or Firm* — Michael Stern

(57) ABSTRACT

Variable index light extraction layers that contain a first region with a first material and a second region including a second material are described, where the first region has a lower effective index of refraction than the second region. Optical films and stacks may use the variable index light extraction layers in front lit or back lit display devices and luminaires.

8 Claims, 8 Drawing Sheets

(52) U.S. Cl.
CPC ........... *G02B 6/006* (2013.01); *G02B 6/0043* (2013.01); *G02B 6/0055* (2013.01); *G02B 6/0065* (2013.01)

(56) References Cited

U.S. PATENT DOCUMENTS

| | | | |
|---|---|---|---|
| 4,751,615 | A | 6/1988 | Abrams |
| 5,396,350 | A | 3/1995 | Beeson |
| 5,845,038 | A | 12/1998 | Lundin |
| 6,347,874 | B1 | 2/2002 | Boyd |
| 6,367,941 | B2 | 4/2002 | Lea |
| 6,425,675 | B2 | 7/2002 | Onishi |
| 6,569,521 | B1 | 5/2003 | Sheridan |
| 7,005,394 | B1 | 2/2006 | Ylitalo |
| 7,057,814 | B2 | 6/2006 | Boyd |
| 7,525,126 | B2 | 4/2009 | Leatherdale |
| 7,862,898 | B2 | 1/2011 | Sherman |
| 7,892,649 | B2 | 2/2011 | Sherman |
| 8,827,532 | B2 | 9/2014 | Wang |
| 2004/0202879 | A1 | 10/2004 | Xia |
| 2006/0216523 | A1 | 9/2006 | Takaki |
| 2006/0270074 | A1 | 11/2006 | Kim |
| 2007/0058391 | A1 | 3/2007 | Wilson |
| 2007/0082969 | A1 | 4/2007 | Malik |
| 2007/0212535 | A1 | 9/2007 | Sherman |
| 2007/0252923 | A1 | 11/2007 | Hwang |
| 2007/0257270 | A1 | 11/2007 | Lu |
| 2008/0101087 | A1* | 5/2008 | Hwang ................ G02B 6/0063 362/619 |
| 2009/0091949 | A1 | 4/2009 | Lee |
| 2010/0067257 | A1 | 3/2010 | Meis |
| 2010/0302802 | A1* | 12/2010 | Bita ..................... G02B 6/0036 362/606 |
| 2011/0032728 | A1 | 2/2011 | Nagata |
| 2011/0039099 | A1 | 2/2011 | Sherman |

FOREIGN PATENT DOCUMENTS

| | | |
|---|---|---|
| WO | WO 2009/011961 A2 | 1/2009 |
| WO | WO 2009-085662 | 7/2009 |
| WO | WO 2009-089137 | 7/2009 |
| WO | WO 2009-114683 | 9/2009 |
| WO | WO 2010-005655 | 1/2010 |
| WO | WO 2010-017087 | 2/2010 |
| WO | WO 2010-077541 | 7/2010 |
| WO | WO 2010-078346 | 7/2010 |
| WO | WO 2010-120422 | 10/2010 |
| WO | WO 2010-120468 | 10/2010 |
| WO | WO 2010-120864 | 10/2010 |
| WO | WO 2010-132176 | 11/2010 |
| WO | WO 2010-151563 | 12/2010 |
| WO | WO 2011-088161 | 7/2011 |
| WO | WO 2011-129848 | 10/2011 |
| WO | WO 2012-061296 | 5/2012 |
| WO | WO 2012-116129 | 8/2012 |
| WO | WO 2012-116199 | 8/2012 |
| WO | WO 2012-116215 | 8/2012 |
| WO | WO 2012-158414 | 11/2012 |
| WO | WO 2013-148407 | 10/2013 |

\* cited by examiner

VARIABLE INDEX LIGHT EXTRACTION LAYER AND METHOD OF MAKING THE SAME

This application is a national stage filing under 35 U.S.C. 371 of PCT/US2013/055954, filed Aug. 21, 2013, which claims priority to Provisional Application No. 61/692,753, filed Aug. 24, 2012, the disclosure of which is incorporated by reference in its/their entirety herein.

BACKGROUND

Light extraction layers are useful in a variety of optical stacks, for example, in displays, general illumination, or other lighting applications. In many of these applications, the light extraction layer may be optically coupled to a lightguide, where the light extraction layer operates to selectively extract light of a particular range of angles from the lightguide. In traditional lightguides, extraction layers have light scattering features in order for light being transported within the lightguide to be directed out of the lightguide. These light scattering features sometimes include diffusely reflective printed extraction dots or structures disposed on or etched into the surface of the lightguide. Unfortunately, many of these layers are either not optically transparent or not significantly non-distorting, making viewing difficult.

SUMMARY

In one aspect, the present disclosure describes variable index light extraction layers. The variable index light extraction layers have first regions including a first substance and second regions including a second substance, where the first substance is a nanovoided polymeric material and the second substance is not a nanovoided polymeric material. The first region has a lower effective index of refraction than the second region and the first and second regions of the layer are disposed such that, when optically coupled to a lightguide, the layer selectively extracts light from the lightguide based on the geometric arrangement of the first and second regions.

In another aspect, the present disclosure describes a method of forming a variable index light extraction layer. The method includes selectively patterning a first substance on a substrate and overcoating a second substance to form a layer, where first regions of the layer correspond to areas where the first substance was selectively printed and second regions of the layer correspond at least to areas between where the first substance was selectively printed. The first region has a lower effective index of refraction than the second region, the first region is a nanovoided polymeric material, and the second substance is not a nanovoided polymeric material. The first and second regions of the layer are disposed such that the layer selectively extracts guided mode light from the substrate based on the geometric arrangement of the first and second regions.

DETAILED DESCRIPTION

Embodiments of the present disclosure include a variable index light extraction layer that may generally include first regions and second regions. The first regions include a first substance and the second regions include a second substance. The first substance and the second substance may have different characteristics; for example, the first substance may be a nanovoided polymeric material while the second substance may not be a nanovoided polymeric material. Likewise, the first regions may have different properties than the second regions; for example, the first regions may have a lower effective index of refraction than the second regions. Because the regions of higher-index optical properties and lower-index optical properties may vary across the optical layer, the optical layer may be referred to as a variable index optical layer. Because the first and second regions are disposed such that, when optically coupled to a lightguide, the layer selectively extracts light from the lightguide based on the geometric arrangement of the first and second regions, the variable index optical layer may be referred to as a variable index light extraction layer.

The variable index light extraction layer may act to extract guided mode light traveling in an adjacent layer at otherwise supercritical angles, while at the same time scattering little to no light for subcritical light incident on the extraction layer. The variable index light extraction layer may illuminate an article or other display element by extracting light from an adjacent layer. In some embodiments, the variable index light extraction layer does not have features that significantly or functionally scatter light, thereby providing little distortion to images and objects on the opposite side. The variable light extraction layer may be transparent, that is, exhibiting little to no haze and high clarity, both with and without illumination. This allows for viewing of images on a reflective display or of a graphic without significant reduction in resolution or contrast, and without visible optical artifacts generated by light scattered or diffracted by different regions.

In some embodiments, the variable index light extraction layer may be optically coupled to one or more lightguides. In other exemplary embodiments, the variable index light extraction layer may be further optically coupled to a reflective scattering element such as a film or reflective display. In reflective display embodiments, it is an advantage of embodiments of the present disclosure that a viewer looking through the variable index light extraction layer would be able to view the pixels of the display (or image) without significant haze or distortion. In addition to optical benefits, variable index light extraction layers of the present disclosure may be produced by relatively simple coating and printing techniques amenable to high speed and low cost manufacturing.

Figure 1A:
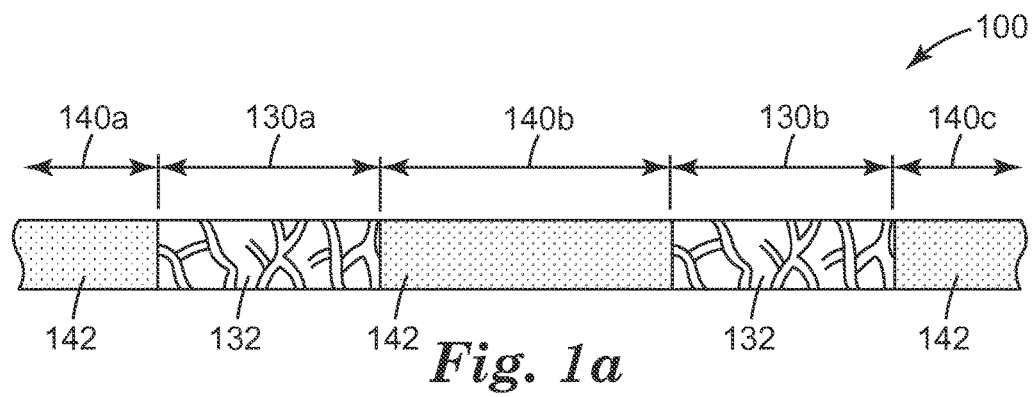
FIG. 1a is a cross-sectional elevation view of a variable index light extraction layer.

FIG. 1a is a cross-sectional elevation view of a variable index light extraction layer. Variable index light extraction layer 100 includes first regions 130a and 130b including first material 132 and second regions 140a, 140b, and 140c including second material 142.

First material 132 located within first regions 130a and 130b may be any suitable material and be formed by any suitable method. In some embodiments, first material 132 may include a low-index material. Exemplary low-index materials may include nanoporous materials, including nanovoided polymeric materials described, for example, elsewhere in this description and in U.S. Patent Application Ser. No. 61/446,740, entitled "Front-Lit Reflective Display Device and Method of Front-Lighting Reflective Display," and filed Feb. 25, 2011. In other embodiments, the low-index material may be a fumed silica based low-index coating such as those described, for example, in U.S. Patent Application Ser. No. 61/617,842, entitled "Protective Coating for Low Index Material," and filed Mar. 30, 2012. The selection of material for first regions may consider any number of suitable factors, such as weight, durability, requirements for processing (for example, whether the material requires a curing step), porosity, refractive index, or transparency (including optical haze, clarity, and transmission). In some embodiments, where the low-index layer is nanovoided and the patterned low-index regions are designed to be small, the patterned low-index regions may be as small as 500 nm, as small as 1 µm, as small as 10 µm, or as small as 50 µm.

Second material 142 within second regions 140a, 140b, and 140c may be of any suitable material. In some embodiments, second material 142 is not a nanovoided polymeric material. Second regions 140a, 140b, and 140c may have different properties than first regions 130a and 130b; for example, second regions 140a, 140b, and 140c may have a higher index of refraction than first regions 130a and 130b. In some embodiments, this may be due to different properties of first material 132 and second material 142.

Figure 1B:
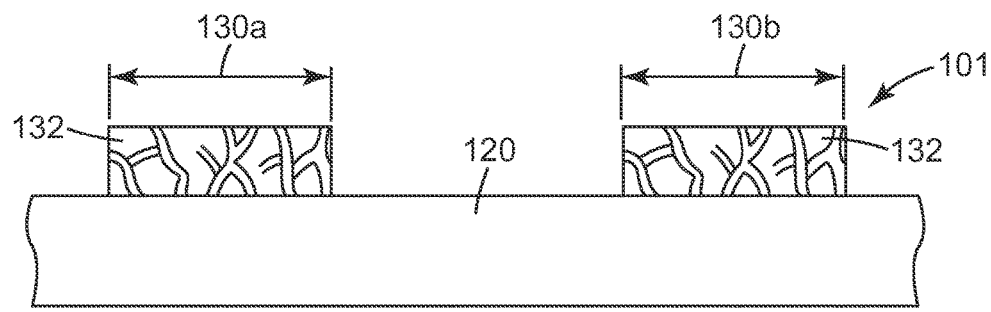
FIG. 1b is a cross-sectional elevation view of a low-index layer.

FIG. 1b is a cross-sectional elevation view of a low-index layer. Low-index layer 101 includes substrate 120 and first regions 130a and 130b, including first material 132. Substrate 120 may be any suitable material and be any suitable shape or size. While shown as substantially planar in FIG. 1b, substrate 120 may be curved in some embodiments, in either one or two dimensions. In some embodiments, the substrate may be annular, forming a tube-like structure. Substrate 120 may also be transparent. In some embodiments, substrate 120 may be a lightguide, meaning that it transports guided mode light through total internal reflection (TIR). As a lightguide, substrate 120 may be an acrylic lightguide, or it may be formed from polycarbonate, polyurethane, or any other suitable material. In other embodiments, substrate 120 may be a polymeric film, such as polyethylene terephthalate (PET). Substrate 120 may be a viscoelastic lightguide, including pressure sensitive adhesives, which may allow for expedient manufacturing or adhesion to adjacent layers in an optical stack. In some embodiments, substrate 120 may also be a reflective scattering element, such as microcavitated polyethylene terephthalate. Substrate 120 may be selected for its optical properties, its physical properties (such as a warp resistance or flexibility), or any other suitable reason.

As described in conjunction with FIG. 1a, first material 132 may include a low-index material; in some cases, first regions may include a nanovoided polymeric material. First regions 130a and 130b may be applied or patterned on substrate 120 through any suitable method. In some embodiments, first regions 130a and 130b are formed by selectively printing first material 132 onto the substrate. Printing may include non-impact or impact printing, or digital or analog printing. First regions 130a and 130b may be formed by selectively patterning first material 132 through flexographic printing, where a gravure roll having pits filled with the low-index material transfers the material to a flexographic roll having a stamp with a desired arrangement of shapes or patterns. A layer of substrate 120 would be passed over and brought into contact with the stamp which effectively stamps or prints the web with first material 132 thus transferring the material from the pattern of the flexographic roll to the surface of substrate 120. Printing may also include other processes include rotogravure printing, screen printing, inkjet printing, and lithographic printing. Other methods of selective patterning, including but not limited to, thermal transfer, intaglio, or spray or needle die coating may be used in creating first regions 130a and 130b on substrate 120.

In some embodiments, first regions 130a and 130b are formed by depositing a continuous region of first material 132, then selectively removing portions of the first material, leaving behind patterned first regions 130a and 130b. The selective removal of first material 132 may be performed by any suitable method, including photolithography in conjunction with wet or dry etching, reactive-ion etching, imprint and nano-imprint lithography.

Figure 1C:
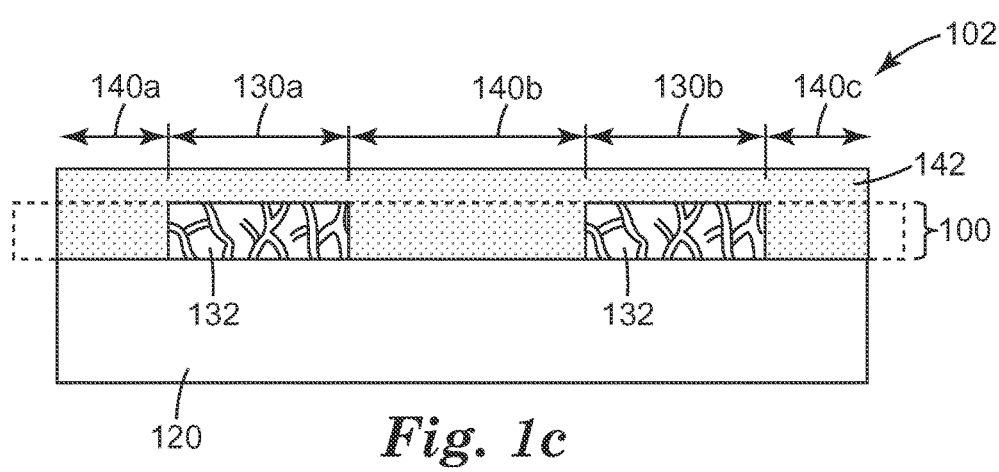
FIG. 1c is a cross-sectional elevation view of another variable index light extraction layer.

FIG. 1c is a cross-sectional elevation view of another variable index light extraction layer based on the low-index layer of FIG. 1b. Variable index light extraction layer 102 includes first regions 130*a* and 130*b* including first material 132 and second regions 140*a*, 140*b*, and 140*c* including second material 142. Variable index region 100 is highlighted to illustrate that the overcoating of second material 142 may create the alternating first and second regions as shown in FIG. 1*a*. For purposes of this description, the term "variable index light extraction layer" is used to refer to the region of alternating or patterned first and second regions, whether or not the regions are patterned on a substrate.

Second material 142, when used as an overcoat, may be any suitable material and may be selected for its physical and optical properties. In some embodiments, second material 142 may have a higher index of refraction than first material 132. Second material 142 may also be selected for its physical properties, such as melt or glass transition temperature, molecular mass, viscosity, or viscoelasticity. Second material 142 may also be selected for its properties as a sealing or protective layer; for example its moisture vapor transmission, water resistant or scratch resistant properties may be considered. In some embodiments, second material 142 may be a viscoelastic material, including an optically clear or pressure sensitive adhesive, a high-index ink, hard coat, polymeric material, or curable resin. The refractive index of second material 142 may be chosen or modified to achieve the desired extraction effect when coupled to a lightguide. In some embodiments, it may be advantageous for second material 142 to be an adhesive, particularly where the variable index light extraction layer 102 is attached to additional films in an optical stack.

Second material 142 may be applied on a low-index layer through any suitable method, including any of the printing, patterning, or coating processes discussed elsewhere. Second material 142 may also be laminated onto a low index layer. Depending on the viscous properties of second material 142, it may be possible to allow the material to flow and fill in the areas on substrate 120 which have not had first regions 130*a* and 130*b* patterned, i.e., between areas of first material 132 corresponding roughly to second regions 140*a*, 140*b*, and 140*c*.

In some embodiments, second material 142 may have a plurality of microstructures on a major surface of the variable index light extraction layer opposite the substrate. The plurality of microstructures may include lenslets, prisms, grooves, or any other regular or irregular surface structure. In some embodiments these plurality of microstructures may be formed or selected to redirect, recycle, or turn light through refraction. In other embodiments, the plurality of microstructures are of a suitable size to extract light through diffraction. The plurality of microstructures may be formed through any suitable method, including through etching, engraving, embossing, microreplication, or a cast-and-cure process. In some embodiments the diffractive or refractive microstructures may be formed at the same time second material 142 is applied, which may simplify the manufacturing of the variable index light extraction layer and thereby provide less complicated and less costly processes.

Figure 1D:
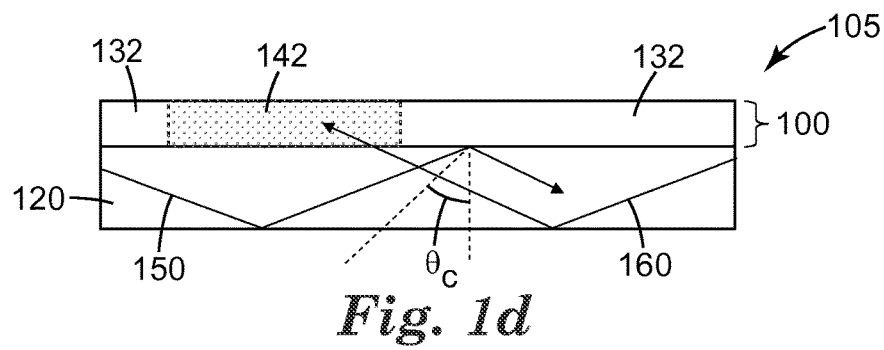
FIG. 1d is a diagram illustrating the optical function of a variable index light extraction layer.

Referring to FIG. 1*d*, which is a simplified view of FIG. 1*c*, light represented by rays 150 and 160 are being transported within adjacent layer 120 by TIR. In this embodiment, the refractive index of first material 132 is that much less than that of the adjacent layer which defines critical angle $\theta_c$ as shown. Light traveling at a supercritical angle represented by ray 150 strikes an interface between adjacent layer 120 and first material 132, and this angle of incidence for ray 150 is greater than $\theta_c$, which results in substantially all of the light being reflected at the interface.

Also, in this embodiment, the refractive index of second material 142 is approximately equal to or greater than that of adjacent layer 120. In this circumstance there is no critical angle at the interface and the light represented by ray 160 passes through the interface between adjacent layer 120 and second material 142, thus being extracted from the adjacent layer into layer 100.

Thus, for the embodiment shown in FIG. 1*c* and FIG. 1*d*, the first and second regions are disposed relative to each other such that light being transported at supercritical angles in an adjacent layer can be extracted selectively by the variable index light extraction layer based on the geometric arrangement of the first and second regions. In some embodiments, selective extraction could include, for example, light being fully or partially extracted through one region but not the other. The variable index light extraction layer may also be configured to extract light from two or more layers optically coupled to it, including two layers or lightguides on opposing sides of the variable index light extraction layer. In some embodiments, variable index light extraction layers may be disposed on two or more sides of a substrate in order to extract light from the two or more sides. For example, a planar substrate designed to be used as a lightguide may have two variable index extraction layers on opposing major surfaces or faces. In another example, a lightguide that may be described as a rod with a square cross-section may have variable light extraction layers on its four major faces. In yet another example, a lightguide that is a cylindrical rod may have a variable light extraction layer covering its curved surface.

Figure 1E:
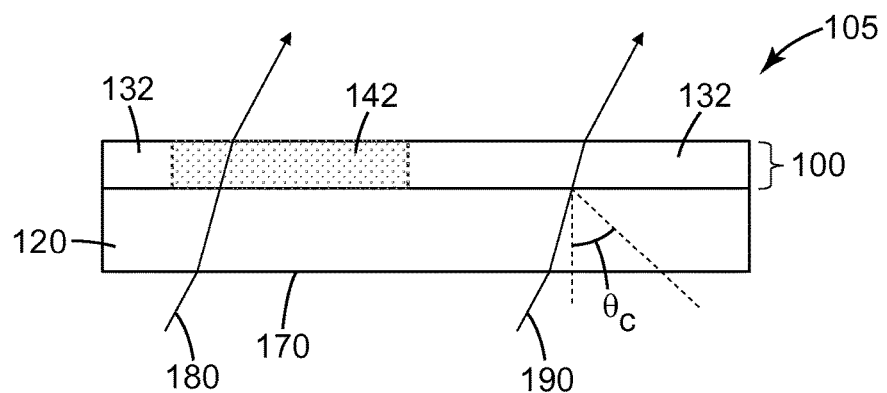
FIG. 1e is another diagram illustrating the optical function of a variable index light extraction layer.

FIG. 1*e* shows the schematic cross section of optical film 105 with light at subcritical angles impinging on the adjacent layer. Light represented by rays 180 and 190 impinges at subcritical angles on surface 170 of adjacent layer 120, and the light travels essentially undeviated through layers 120 and 100. Light represented by ray 190 travels through first material 132, and light represented by ray 180 travels through second material 142. There is little to no deviation of light travelling through the different regions of variable index light extraction layer 100. This results in an optical film, such as exemplary optical film 105, that may have low haze and high clarity, such that when one looks through the optical film there is little to no distortion of images on the opposite side. The variable index light extraction layer can have any geometric arrangement of first and second regions, including random or pseudorandom arrangements, to produce the desired extracted light pattern.

Figure 2:
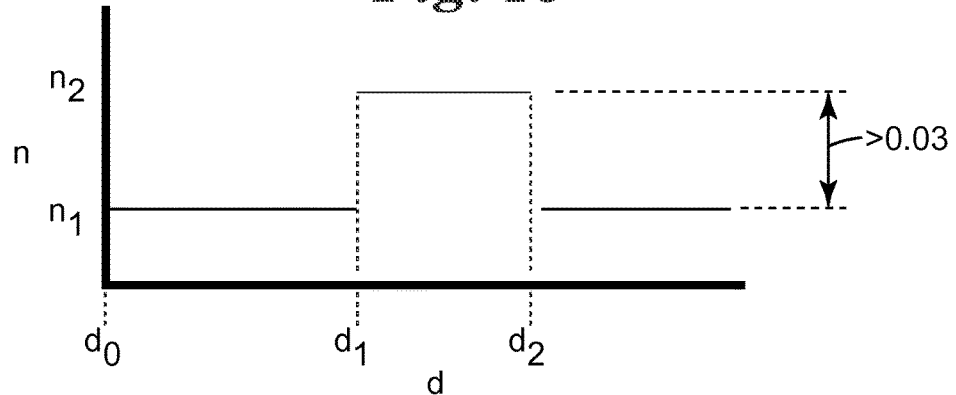
FIG. 2 is a diagram illustrating a relationship between location on the variable index light extraction of FIG. 1a or FIG. 1c and effective refractive index.

In general, the refractive index profile of the variable index light extraction layer may vary in any way, as long as the desired optical performance of the layer is obtained. FIG. 2 illustrates the variable index light extraction layer having refractive indices that can vary across a transverse plane of the layer. The refractive index profile shows a plot of distance d, which corresponds to a distance across a transverse plane of the layer, for the layer in plan view. FIG. 2 shows that at some initial position on the layer corresponding to $d_0$, the layer has first refractive index $n_1$ corresponding to the first region. Moving across the transverse plane of the layer, first refractive index $n_1$ is observed until reaching $d_1$ where the refractive index of the layer abruptly increases to $n_2$ which corresponds to the second refractive index of the second region. Continuing to move across the transverse plane of the layer, the second refractive index $n_2$ is observed until reaching $d_2$ where the refractive index of the layer abruptly decreases to $n_1$ indicating a second first region.

The change in refractive index between two adjacent first and second regions having low and high indices, respectively, can vary in a number of ways. For example, the change in refractive index can be abrupt, as in a step function, between two adjacent regions. For another example, the change in refractive index can be monotonic, with the refractive index continuously increasing or decreasing (depending on whether the change is observed as a function of moving from the first region to the second region, or the second region to the first region, respectively). In some cases, the first and second refractive indices of the adjacent first and second regions vary as some combination of step and monotonic functions.

The first region of the variable light extraction layer has a refractive index less than that of the second region. For example, the first refractive index may be less than about 1.4, less than about 1.3 or less than about 1.2. The first refractive index may be from about 1.15 to about 1.45, from about 1.2 to about 1.42, from about 1.2 to about 1.40 or from about 1.2 to about 1.35. In general, the particular first and second refractive indices, as well as the particular difference between the two, depends on the desired optical performance of the variable index light extraction layer as described below. The difference in refractive index between the first and second regions is greater than about 0.03. In some embodiments, the difference in refractive index between the first and second regions is greater than 0.05, greater than 0.1, greater than 0.2 or greater than 0.25.

The nanovoided polymeric material typically includes a plurality of interconnected nanovoids or a network of nanovoids dispersed in a binder. At least some of the nanovoids in the plurality or network are connected to one another via hollow tunnels or hollow tunnel-like passages. The nanovoids are not necessarily free of all matter and/or particulates. For example, in some cases, a nanovoid may include one or more small fiber- or string-like objects that include, for example, a binder and/or nano-particles. Some disclosed first regions include multiple pluralities of interconnected nanovoids or multiple networks of nanovoids where the nanovoids in each plurality or network are interconnected. In some cases, in addition to multiple pluralities of interconnected nanovoids, the disclosed first regions may include a fraction of closed or unconnected nanovoids meaning that the nanovoids are not connected to other nanovoids via tunnels.

The nanovoided polymeric material is designed to support TIR by virtue of including a plurality of nanovoids. When light that travels in an optically transparent (clear and non-porous) adjacent layer and that light is incident on a stratum possessing high porosity, the reflectivity of the incident light is much higher at oblique angles than at normal incidence. In the case of nanovoided first regions having little to no haze, the reflectivity at oblique angles greater than the critical angle is close to about 100%. In such cases, the incident light undergoes TIR.

The nanovoids in the disclosed first region have an index of refraction $n_v$ and a permittivity $\varepsilon_v$, where $n_v^2 = \varepsilon_v$, and the binder has an index of refraction $n_b$ and a permittivity $\varepsilon_b$, where $n_b^2 = \varepsilon_b$. In general, the interaction of a layer of nanovoided polymeric material with light, such as light that is incident on, or propagates in, the layer, depends on a number of characteristics of the layer such as, for example, the layer thickness, the binder index, the nanovoid or pore index, the pore shape and size, the spatial distribution of the pores, and the wavelength of light. In some cases, light that is incident on or propagates within the layer of nanovoided polymeric material "sees" or "experiences" an effective permittivity $\varepsilon_{eff}$ and an effective index $n_{eff}$, where $n_{eff}$ can be expressed in terms of the nanovoid index $n_v$, the binder index $n_b$, and the nanovoid porosity or volume fraction "f". In such cases, the layer is sufficiently thick and the nanovoids are sufficiently small so that light cannot resolve the shape and features of a single or isolated nanovoid. In such cases, the size of at least a majority of the nanovoids, such as at least 60% or 70% or 80% or 90% of the nanovoids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light.

In some embodiments, light that is incident on a disclosed first region of the variable light extraction layer is visible light which can be in a range of from about 380 nm to about 750 nm, or from about 400 nm to about 700 nm, or from about 420 nm to about 680 nm. In such cases, the first region of the variable light extraction layer has an effective index of refraction and includes a plurality of nanovoids if the size of at least a majority of the nanovoids, such as at least 60% or 70% or 80% or 90% of the nanovoids, is not greater than about 70 nm, or not greater than about 60 nm, or not greater than about 50 nm, or not greater than about 40 nm, or not greater than about 30 nm, or not greater than about 20 nm, or not greater than about 10 nm.

In some cases, the disclosed first region of the variable index light extraction layer is sufficiently thick so that the region can reasonably have an effective index that can be expressed in terms of the indices of refraction of the nanovoids and the binder, and the nanovoid or pore volume fraction or porosity. In such cases, the thickness of the first region is not less than about 100 nm, or not less than about 200 nm, or not less than about 500 nm, or not less than about 700 nm, or not less than about 1,000 nm.

When the nanovoids in a disclosed first region are sufficiently small and the region is sufficiently thick, the first region has an effective permittivity $\varepsilon_{eff}$ that can be expressed as:

$$\varepsilon_{eff} = f\varepsilon_v + (1-f)\varepsilon_b \quad (1)$$

In such cases, the effective index $n_{eff}$ of the first region can be expressed as:

$$n_{eff}^2 = fn_v^2 + (1-f)n_b^2 \quad (2)$$

In some cases, such as when the difference between the indices of refraction of the pores and the binder is sufficiently small, the effective index of the first region can be approximated by the following expression:

$$n_{eff} = fn_v + (1-f)n_b \quad (3)$$

In such cases, the effective index of the first region is the volume weighted average of the indices of refraction of the nanovoids and the binder. For example, a first region that has a void volume fraction of about 50% and a binder that has an index of refraction of about 1.5, has an effective index of about 1.25.

Figure 3:
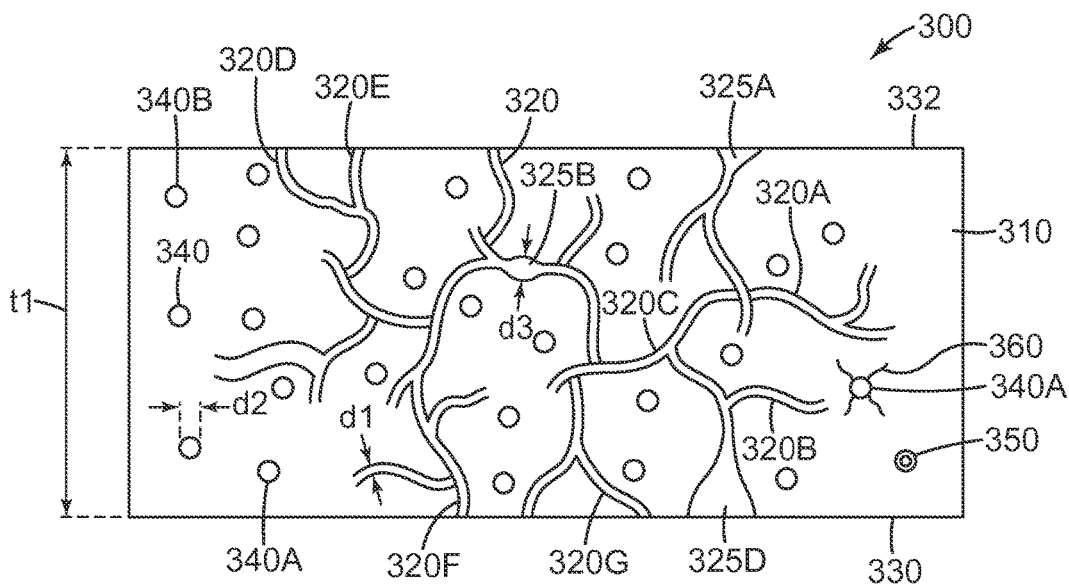
FIG. 3 is a schematic cross-sectional view of a nanovoided polymeric material.

FIG. 3 is a schematic cross-sectional view of a first region of the variable index light extraction layer that includes a network of nanovoids or plurality of interconnected nanovoids and a plurality of particles dispersed substantially uniformly within a binder. First region 300 includes plurality of interconnected nanovoids 320 dispersed in binder 310. Nanovoids 320 includes interconnected nanovoids 320A-320C. First and second major surfaces 330 and 332, respectively, are porous as indicated by surface pores 320D-G which may or may not provide a tunnel that extends from one surface to another or through the thickness of the region. Some of the nanovoids, such as nanovoids 320B and 320C, are within the interior of the first region and may or may not tunnel to a surface.

Voids 320 have a size $d_1$ that can generally be controlled by choosing suitable composition and fabrication, such as coating, drying and curing conditions. In general, $d_1$ can be any desired value in any desired range of values. For example, in some cases, at least a majority of the nanovoids, such as at least 60% or 70% or 80% or 90% or 95% of the nanovoids, have a size that is in a desired range. For example, in some cases, at least a majority of the nanovoids, such as at least 60% or 70% or 80% or 90% or 95% of the nanovoids, have a size that is not greater than about 500 nm, not greater than 400 nm, not greater than about 300 nm, not greater than about 200 nm, not greater than about 100 nm, not greater than about 70 nm, or not greater than about 50 nm. In some cases, some of the nanovoids can be sufficiently small such that the refractive index of the region is changed, with little or no scattering of light.

Binder 310 can include any material such as a polymer. The binder may be a polymer formed from a polymerizable composition including monomers, wherein the monomers are cured using actinic radiation, e.g., visible light, ultraviolet radiation, electron beam radiation, heat and combinations thereof, or any of a variety of conventional anionic, cationic, free radical or other polymerization techniques, which can be chemically or thermally initiated. Polymerization may be carried out using solvent polymerization, emulsion polymerization, suspension polymerization, bulk polymerization, and the like. Useful monomers include small molecules having a molecular weight less than about 500 g/mole, oligomers having a molecular weight of greater than 500 to about 10,000 g/mole, and polymers having a molecular weight of greater than 10,000 to about 100,000 g/mole.

Representative examples of curable groups suitable in the practice of the present disclosure include epoxy groups, ethylenically unsaturated groups, olefinic carbon-carbon double bonds, allyloxy groups, (meth)acrylate groups, (meth)acrylamide groups, cyanoester groups, vinyl ethers groups, combinations of these, and the like. The monomers may be mono- or multifunctional and capable of forming a crosslinked network upon polymerization. As used herein, (meth)acrylate refers to acrylate and methacrylate, and (meth)acrylamide refers to acrylamide and methacrylamide.

Useful monomers include styrene, alpha-methylstyrene, substituted styrene, vinyl esters, vinyl ethers, N-vinyl-2-pyrrolidone, (meth)acrylamide, N-substituted (meth)acrylamide, octyl(meth)acrylate, iso-octyl(meth)acrylate, nonylphenol ethoxylate(meth)acrylate, isononyl(meth)acrylate, diethylene glycol(meth)acrylate, isobornyl(meth)acrylate, 2-(2-ethoxyethoxy)ethyl(meth)acrylate, 2-ethylhexyl(meth) acrylate, lauryl(meth)acrylate, butanediol mono(meth)acrylate, beta-carboxyethyl(meth)acrylate, isobutyl(meth)acrylate, cycloaliphatic epoxide, alpha-epoxide, 2-hydroxyethyl (meth)acrylate, (meth)acrylonitrile, maleic anhydride, itaconic acid, isodecyl(meth)acrylate, dodecyl(meth)acrylate, n-butyl(meth)acrylate, methyl(meth)acrylate, hexyl (meth)acrylate, (meth)acrylic acid, N-vinylcaprolactam, stearyl(meth)acrylate, hydroxyl functional polycaprolactone ester(meth) acrylate, hydroxyethyl(meth)acrylate, hydroxymethyl(meth)acrylate, hydroxypropyl(meth)acrylate, hydroxyisopropyl(meth)acrylate, hydroxybutyl(meth) acrylate, hydroxyisobutyl(meth)acrylate, tetrahydrofurfuryl (meth)acrylate, combinations of these, and the like.

Functional oligomers and polymers may also be collectively referred to herein as "higher molecular weight constituents or species." Suitable higher molecular weight constituents may be incorporated into compositions of the present disclosure. Such higher molecular weight constituents may provide benefits including viscosity control, reduced shrinkage upon curing, durability, flexibility, adhesion to porous and nonporous substrates, outdoor weatherability, and/or the like. The amount of oligomers and/or polymers incorporated into fluid compositions of the present disclosure may vary within a wide range depending upon such factors as the intended use of the resultant composition, the nature of the reactive diluent, the nature and weight average molecular weight of the oligomers and/or polymers, and the like. The oligomers and/or polymers themselves may be straight-chained, branched, and/or cyclic. Branched oligomers and/or polymers tend to have lower viscosity than straight-chain counterparts of comparable molecular weight.

Exemplary polymerizable oligomers or polymers include aliphatic polyurethanes, acrylics, polyesters, polyimides, polyamides, epoxy polymers, polystyrene (including copolymers of styrene) and substituted styrenes, silicone containing polymers, fluorinated polymers, combinations of these, and the like. For some applications, polyurethane and acrylate oligomers and/or polymers can have improved durability and weatherability characteristics. Such materials also tend to be readily soluble in reactive diluents formed from radiation curable, (meth)acrylate functional monomers.

Because aromatic constituents of oligomers and/or polymers generally tend to have poor weatherability and/or poor resistance to sunlight, aromatic constituents can be limited to less than 5 weight percent, preferably less than 1 weight percent, and can be substantially excluded from the oligomers and/or polymers and the reactive diluents of the present disclosure. Accordingly, straight-chained, branched and/or cyclic aliphatic and/or heterocyclic ingredients are preferred for forming oligomers and/or polymers to be used in outdoor applications.

Suitable radiation curable oligomers and/or polymers for use in the present disclosure include, but are not limited to, (meth)acrylated urethanes (i.e., urethane(meth)acrylates), (meth)acrylated epoxies (i.e., epoxy(meth)acrylates), (meth) acrylated polyesters (i.e., polyester(meth)acrylates), (meth) acrylated(meth)acrylics, (meth)acrylated silicones, (meth) acrylated polyethers (i.e., polyether(meth)acrylates), vinyl (meth)acrylates, and (meth)acrylated oils.

Materials useful for toughening the nanovoided layer 300 include resins with high tensile strength and high elongation, for example, CN9893, CN902, CN9001, CN961, and CN964 that are commercially available from Sartomer Company, Exton, Pa.; and EBECRYL 4833 and Eb8804 that are commercially available from Cytec, Woodland Park, N.J. Suitable toughening materials also include combinations of "hard" oligomeric acrylates and "soft" oligomeric acrylates. Examples of "hard" acrylates include polyurethane acrylates such as EBECRYL 4866, polyester acrylates such as EBECRYL 838, and epoxy acrylates such as EBECRYL 600, EBECRYL 3200, and EBECRYL 1608 (commercially available from Cytec); and CN2920, CN2261, and CN9013 (commercially available from Sartomer Company). Examples of the "soft" acrylates include EBECRYL 8411 that is commercially available from Cytec; and CN959, CN9782, and CN973 that are commercially available from Sartomer Company. These materials are effective at toughening the nanovoided structured layer when added to the coating formulation in the range of 5-25% by weight of total solids (excluding the solvent fraction).

The nanovoided polymeric material may or may not contain particles. Particles 340 have a size $d_2$ that can be any desired value in any desired range of values. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 5 um, or not greater than about 3 um, or not greater than about 2 um, or not greater than about 1 micron, or not greater than about 700 nm, or not greater than about 500 nm, or not greater than about 200 nm, or not greater than about 100 nm, or not greater than about 50 nm.

In some cases, particles 340 have an average particle size that is not greater than about 5 um, not greater than about 3 um, not greater than about 2 um, not greater than about 1 um, not greater than about 700 nm, not greater than about 500 nm, not greater than about 200 nm, not greater than about 100 nm, or not greater than about 50 nm. In some cases, some of the particles can be sufficiently small such that the refractive index of the region is changed, with little or no scattering of light.

In some cases, $d_1$ and/or $d_2$ are sufficiently small such that the refractive index of the region is changed, with little or no scattering of light. In such cases, for example, $d_1$ and/or $d_2$ are not greater than about $\lambda/5$, not greater than about $\lambda/6$, not greater than about $\lambda/8$, not greater than about $\lambda/10$, not greater than about $\lambda/20$, where $\lambda$ is the wavelength of light. As another example, in such cases, $d_1$ and $d_2$ are not greater than about 70 nm, not greater than about 60 nm, not greater than about 50 nm, not greater than about 40 nm, not greater than about 30 nm, not greater than about 20 nm, or not greater than about 10 nm.

Other properties of particles used in the nanovoided polymeric layer include shape. The particles can have a regular shape such as spherical, or an irregular shape. The particles can be elongated having an average aspect ratio that is not less than about 1.5, not less than about 2, not less than about 3, not less than about 4, or not less than about 5. In some cases, the particles can be in the form or shape of a string-of-pearls (such as SNOWTEX-PS particles available from Nissan Chemical USA, Houston, Tex.) or aggregated chains of spherical or amorphous particles, such as fumed silica.

The nanoparticles can be inorganic or organic, or a combination thereof. In some embodiments, the nanoparticles can be porous particles, hollow particles, solid particles, or a combination thereof. Examples of suitable inorganic nanoparticles include silica and metal oxides such as zirconia, titania, ceria, alumina, iron oxide, vanadia, antimony oxide, tin oxide, alumina/silica, silica/zirconia and combinations thereof. The nanoparticles can be surface-modified such that they bond to the binder chemically and/or physically. In the former case, the surface-modified nanoparticles have functionality that chemically reacts with the binder. In general, surface modification is well known and can be carried out with conventional materials and techniques as described in the references cited above.

The weight ratio of binder to nanoparticles can range from about 30:70, 40:60, 50:50, 55:45, 60:40, 70:30, 80:20 or 90:10 or more depending on the desired properties of the nanovoided polymeric layer. The preferred ranges of wt % of nanoparticles range from about 10% by weight to about 60% by weight, and can depend on the density and size of the nanoparticle used.

In cases where the primary optical effect of network of voids 320 and particles 340 is to affect the effective index and to minimize scattered light, the optical haze of optical layer 300 that is due to voids 320 and particles 340 is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the effective index of the effective medium of the optical layer is not greater than about 1.40, or not greater than about 1.35, or not greater than about 1.3, or not greater than about 1.25, or not greater than about 1.2, or not greater than about 1.15.

First region 300 can have other materials in addition to binder 310 and particles 340. For example, first region 300 can include one or more additives, such as for example, coupling agents, to help wet the surface of a substrate, not expressly shown in FIG. 3, on which the nanovoided polymeric material is formed. Other exemplary materials in first region 300 include initiators, such as one or more photo-initiators, anti-stats, UV absorbers and release agents.

The nanovoided polymeric material is typically formed as a layer, whether patterned or not. Methods for making a layer of the nanovoided polymeric material are described in, for example, WO 2010/120422 A1 (Kolb et al.) and WO 2010/120468 A1 (Kolb et al.). In one process, first a solution is prepared that includes a plurality of particles, such as nano-particles, and a polymerizable material dissolved in a solvent, where the polymerizable material can include, for example, one or more types of monomers. Next, the polymerizable material is polymerized, for example by applying heat or light, to form an insoluble polymer matrix in the solvent. In some cases, after the polymerization step, the solvent may still include some of the polymerizable material, although at a lower concentration. Next, the solvent is removed by drying or evaporating the solution resulting in first region 300 that includes a network or a plurality of voids 320 dispersed in polymer binder 310. The first region further includes plurality of particles 340 dispersed in the polymer. The particles are bound to the binder, where the bonding can be physical or chemical.

In general, a nanovoided polymeric layer can be formed with a desired porosity or void volume, which can depend on the desired properties of the first region of the variable index light extraction layer. For example, the first region may have a void volume of about 20% to about 70%, about 30% to about 70% or about 40% to about 70%. In some cases, the void volume is not less than about 20%, not less than about 30%, not less than about 40%, not less than about 50%, not less than about 60%, not less than about 70%, not less than about 80%, or not less than about 90%.

In some embodiments, first region 300 has a low optical haze. In such cases, the optical haze of the optical layer is not greater than about 10%, or not greater than about 7%, or not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. The haze variation across the first region can be in the range of from about 1%-5%, of from about 1%-3%, of from about 1%-2%, or less than 1%. In such cases, the optical film can have a reduced effective index that is not greater than about 1.40, or not greater than about 1.35, or not greater than about 1.3, or not greater than about 1.2, or not greater than about 1.15, or not greater than about 1.1, or not greater than about 1.05. For light normally incident on optical layer 300, optical haze, as used herein, is defined as the ratio of the transmitted light that deviates from the normal direction by more than 4 degrees to the total transmitted light. Haze values disclosed herein were measured using a HAZE-GARD PLUS haze meter (BYK-Gardiner, Silver Springs, Md.) according to the procedure described in ASTM D1003.

In some embodiments, first region 300 has a high optical clarity. For light normally incident on first region 300, optical clarity, as used herein, refers to the ratio $(T_1-T_2)/(T_1+T_2)$, where $T_1$ is the transmitted light that deviates from the normal direction between 1.6 and 2 degrees, and $T_2$ is the transmitted light that lies between zero and 0.7 degrees from the normal direction. Clarity values disclosed herein were measured using a HAZE-GARD PLUS haze meter from BYK-Gardiner. In the cases where first region 300 has a high optical clarity, the clarity is not less than about 80%, or not less than about 85%, or not less than about 90%, or not less than about 95%.

The nanovoided polymeric material of the first region 300, can be made by coating or patterning the solvent containing solution described above onto a substrate. In many cases the substrate can be formed of any polymeric material useful in a roll to roll process. In some embodiments the substrate layer is transparent with little to no haze and high clarity and is formed of polymers such as polyethylene terephthalate (PET), polycarbonates, acrylics, and cycloolefin polymers. The substrate may also include transparent substrates such as glass and other transparent inorganic materials. The substrate may also include reflective scattering substrates or materials such as diffuse white polymeric substrates, semispecular substrates polymeric substrates such as multilayer optical films (for example ESR available from 3M), metallic semispecular reflectors for example brushed aluminum. In some cases the substrate may include a release liner such that the nanovoided polymeric layer 300 may be transferred to another substrate for example to an adhesive layer.

The first and second regions may be disposed relative to each other, across a transverse plane of the variable index light extraction layer, in order to manage light in a desired way. For example, the second region may include a plurality of second regions arranged in a pattern across a transverse plane of the layer. For another example, the second region may include a plurality of second regions arranged randomly across a transverse plane of the layer. Either the first or second region may be a continuous region across a transverse plane of the layer. For a first or second region that is discontinuous, i.e., is a plurality of regions, the density can vary in any direction across a transverse plane of the layer. For example, the density of second regions can vary in one or two dimensions across a transverse plane of the layer. Several of these embodiments are described in FIGS. 4a-4d, 5a and 5b.

The optimal thickness of the variable index light extraction layer is determined by the function that the layer is designed to perform. The layer thickness depends on the nature of the nanovoided polymeric material. The variable index light extraction layer should be thick enough such that the first region can provide optical isolation of an adjacent transparent substrate, in which supercritical light is propagating, from another layer which is disposed on an opposing side of the variable index light extraction layer. In some cases the variable index light extraction layer has a thickness greater than about 500 nm, or in the range of from about 500 nm to about 100 um, from about 500 nm to about 8 um, from about 1 micron to about 5 um, or from about 1 um to about 3 um.

The variable index light extraction layer supports or promotes TIR, and so the layer is sufficiently thick so that the evanescent tail of a light ray that undergoes TIR at a surface of the variable index light extraction layer does not optically couple, or optically couples very little, across the thickness of the layer. In such cases, the thickness of the variable index light extraction layer is not less than about 0.5 μm, not less than about 1 μm, not less than about 1.1 μm, not less than about 1.2 μm, not less than about 1.3 μm, not less than about 1.4 μm, not less than about 1.5 μm, not less than about 1.7 μm, or not less than about 2 μm. A sufficiently thick variable index light extraction layer can prevent or reduce an undesired optical coupling of the evanescent tail of an optical mode across the thickness of the layer.

In some cases, the variable index light extraction layer has low optical haze measured as a bulk property of the layer. In such cases, the optical haze of the variable index light extraction layer is not greater than about 10%, not greater than about 7%, not greater than about 5%, not greater than about 4%, not greater than about 3.5%, not greater than about 4%, not greater than about 3%, not greater than about 2.5%, not greater than about 2%, not greater than about 1.5%, or not greater than about 1%. In such cases, the variable index light extraction layer can have a reduced effective index that is not greater than about 1.40, not greater than about 1.35, not greater than about 1.3, not greater than about 1.2, not greater than about 1.15, not greater than about 1.1, or not greater than about 1.05. Optical haze, as used herein, is defined for normally incident light on the surface of a given layer, as the ratio of the transmitted light that deviates from the normal direction by more than 4 degrees to the total transmitted light. Haze values disclosed herein were measured using a HAZE-GARD PLUS haze meter (BYK-Gardiner, Silver Springs, Md.) according to the procedure described in ASTM D1003.

In some cases, the variable index light extraction layer has high optical clarity. Optical clarity, as used herein, is defined for light normally incident on the layer and refers to the ratio $(T_1-T_2)/(T_1+T_2)$, where $T_1$ is the transmitted light that deviates from the normal direction between 1.6 and 2 degrees, and $T_2$ is the transmitted light that lies between zero and 0.7 degrees from the normal direction. Clarity values disclosed herein were measured using a Haze-Gard Plus haze meter from BYK-Gardiner. In cases where variable index light extraction layer has high optical clarity, the clarity is not less than about 80%, not less than about 85%, not less than about 90%, or not less than about 95%.

Figure 4A:
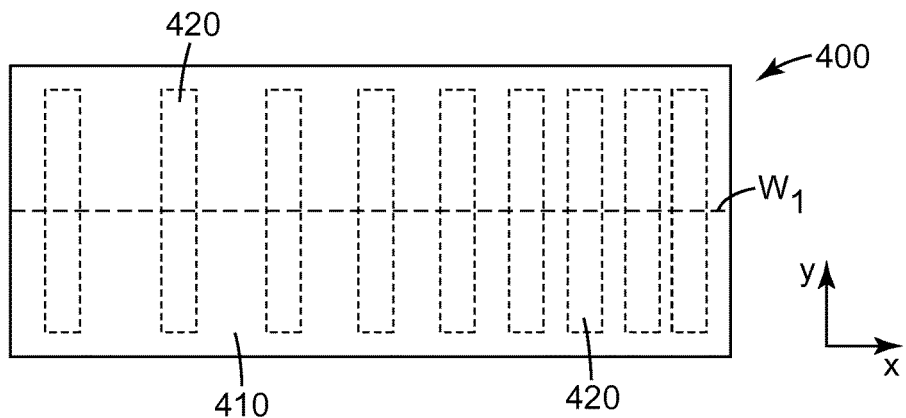
FIG. 4a is a plan view of a variable index light extraction layer showing an exemplary geometric arrangement of first and second regions.

The variable index light extraction layer can include the first and second regions disposed relative to each other, in some desired geometric arrangement across a transverse plane of the layer, so that the layer provides desired optical performance features. FIG. 4a is a plan view of a variable index light extraction layer showing an exemplary geometric arrangement of the first and second regions. Variable index light extraction layer 400 includes first region 410 that is continuous across the layer as seen in plan view of the layer, and second regions 420 are discrete regions enclosed by the rectangles illustrated using dashed lines. As stated above, dashed lines are used throughout this disclosure to indicate general location of the first and second regions, however, these dashed lines are not meant to describe any sort of boundary between the regions.

Figure 4B:
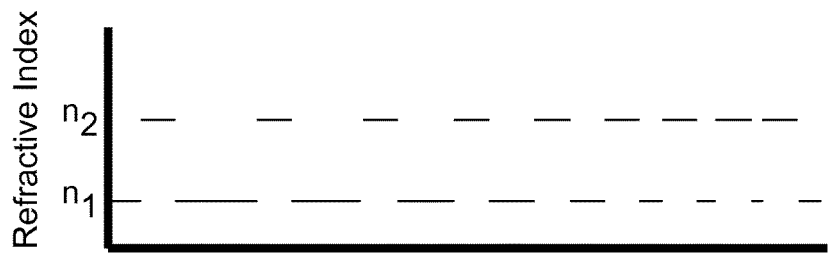
FIG. 4b is a diagram illustrating the effective refractive index profile for the variable index light extraction layer shown in FIG. 4a along the line $w_1$.
Figure 4C:
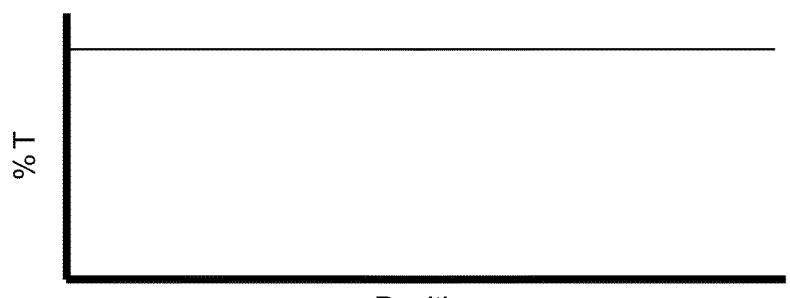
FIG. 4c is a diagram illustrating the transmission for the variable index light extraction layer shown in FIG. 4a along the line $w_1$.
Figure 4D:
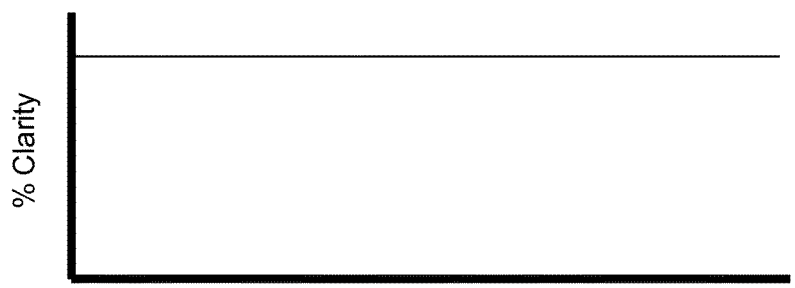
FIG. 4d is a diagram illustrating the clarity for the variable index light extraction layer shown in FIG. 4a along the line $w_1$.

Second regions 420 are shaped as rectangles or stripes of substantially the same length and width, extending across the width of layer 400, and disposed from left to right with increasing frequency. Second regions 420 have a refractive index greater than that of first region 410, in some embodiments by at least about 0.03. FIG. 4b illustrates the refractive index profile for variable index light extraction layer 400 with the x-axis identifying positions d down the length of the layer at some substantially single position $w_1$ as shown in FIG. 4a. The refractive index profile shows the variation in the refractive index of layer 400 which includes a pattern between first and second refractive indices, $n_1$ and $n_2$, respectively. FIGS. 4c and 4d show profiles for selected optical properties % transmission and % clarity, respectively, and for both properties, there is substantially little or no variation down the length of the layer.

Figure 5A:
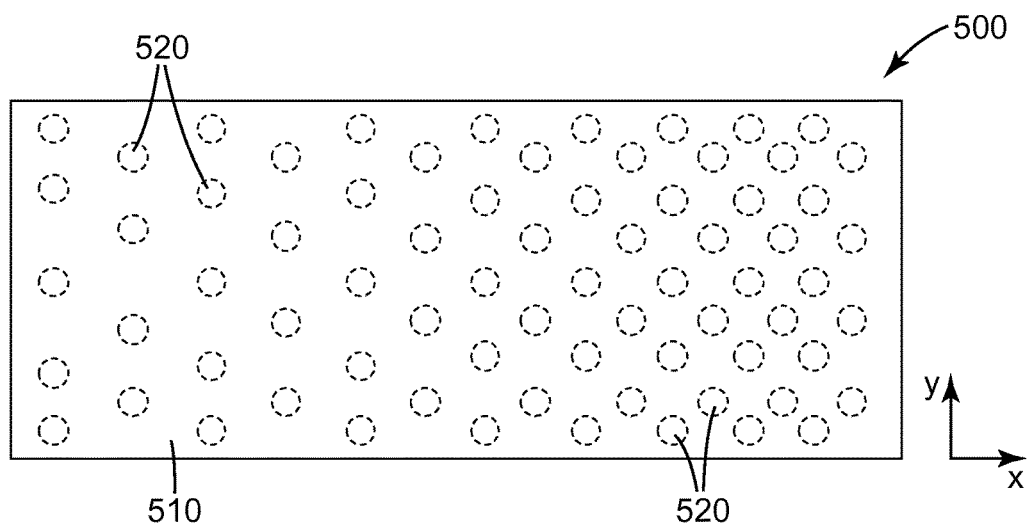
FIG. 5a is a plan view of a variable index light extraction layer showing another exemplary geometric arrangement of first and second regions.

FIG. 5a shows a plan view of another variable index light extraction layer showing an exemplary geometric arrangement of the first and second regions. Variable index light extraction layer 500 includes first region 510 that is across the layer as seen in plan view of the layer, and second regions 520 that are discrete regions enclosed by the circles illustrated using dashed lines. In some embodiments the first and second regions may be reversed from FIG. 5a; that is, the first region may be enclosed by the shapes. The pattern also shows that the density of the second regions 520 can vary in both the x and y dimensions.

Figure 5B:
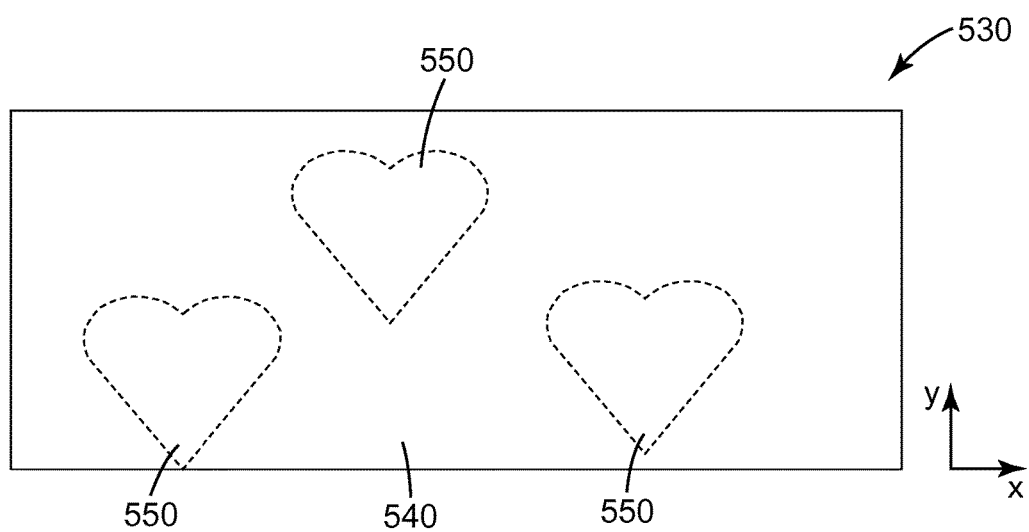
FIG. 5b is a plan view of a variable index light extraction layer showing yet another exemplary geometric arrangement of first and second regions.

FIG. 5b shows a plan view of another variable index light extraction layer showing an exemplary geometric arrangement of the first and second regions. Variable index light extraction layer 530 includes first region 540 that is across the layer as seen in plan view of the layer, and second regions 550 are discrete regions enclosed by the shapes, in this case hearts, as illustrated using dashed lines. In some embodiments the first and second regions may be reversed from FIG. 5b; that is, the first region may be enclosed by the shapes. The pattern shows that the geometric arrangement of high index regions do not have to vary in a gradient fashion, but that they may also be patterned to provide image-wise extraction of supercritical light from an adjacent transparent layer.

The geometric arrangement of the first and second regions of the variable light extraction layer may be designed to extract supercritical light propagating in an adjacent transparent layer and deliver that light to another layer on the opposing side of the variable index light extraction layer in a pattern, for example substantially uniform illumination.

The variable index light extraction layer may be disposed on a substrate. The substrate may include a support used to manufacture the layer as described in PCT Application No. US 2011/021053 (Wolk et al.). In some embodiments, an optical film includes the variable index light extraction layer disposed on a transparent substrate. As used herein, "transparent" means substantially optically clear and substantially low haze and non-scattering. Exemplary transparent substrates have requisite optical properties depending on desired properties of the optical film. The transparent substrate may include a polymeric substrate such as a polyester, poly(meth)acrylate, polycarbonate and the like. In some embodiments, the transparent substrate includes a lightguide as described below. In some embodiments, the transparent substrate has some level of haze and can provide some light scattering such that light can be scattered in a forward direction toward reflective scattering element layer 650.

Figure 6:
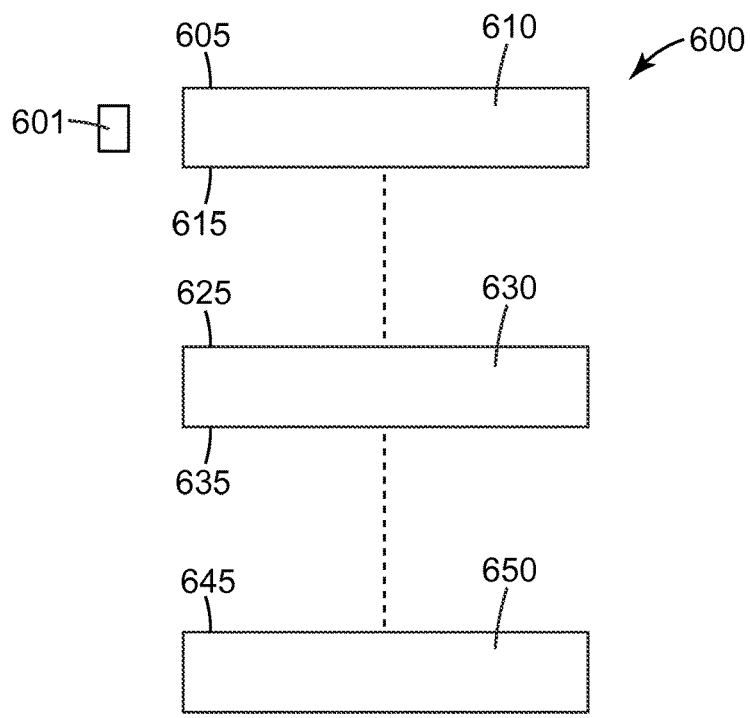
FIG. 6 is an exploded cross-sectional elevation view of an optical stack including the variable index light extraction layer of FIG. 1a or FIG. 1c.

FIG. 6 shows a schematic of exemplary illumination device 600 including the variable index light extraction layer in combination with a reflective scattering element which is illuminated by the device. Illumination device 600 includes lightguide 610 disposed adjacent to variable light extraction layer 630. The lightguide is optically coupled to the top surface 625 of the variable index light extraction layer 630 (denoted by the dashed line between the two surfaces). Adjacent opposing surface 635 of the variable index light extraction layer is reflective scattering element 650 shown in the form of a layer for simplicity. The reflective scattering element is optically coupled to the bottom surface of the variable index light extraction layer 635 (denoted by the dashed line between the two surfaces). Light source 601 is optically coupled to lightguide 610 such that light emitted by the light source can enter the lightguide. In some embodiments, there are no air gaps between the bottom surface 615 of lightguide 610 and the top surface 625 of the variable index light extraction layer 630 and there are no air gaps between the bottom surface 635 of the variable index light extraction layer 630 and the surface 645 of reflective scattering element 650 in order for optical coupling to occur.

In some embodiments, lightguide 610 has a refractive index between those of the first and second regions of the variable index light extraction layer.

In some embodiments, variable light extraction layer 630 can be disposed directly on surface 645 of reflective scattering element 650. Lightguide 610 can be directly attached to surface 625 of the variable light extraction layer by several methods. As described below, lightguide 610 can include a thermoplastic resin material, for example, an acrylic, and in these cases, the lightguide can be formed by either casting molten resin onto surface 625 of the variable index extraction layer, or it can be attached to the variable index extraction layer by an insert injection molding process. In some cases lightguide 610 includes an elastomeric material such that it can be heat laminated to surface 625 of the variable index extraction layer. In some cases lightguide 610 includes a pressure sensitive adhesive (PSA) such that it can be directly laminated to surface 625 of the variable index extraction layer. In cases where lightguide 610 is not an adhesive, surface 625 of the variable index light extraction layer can be adhered to surface 615 of the lightguide using an optically clear adhesive. Optically clear adhesives are described below.

Lightguide 610 may include any suitable material or materials. For example, the lightguide may include glass, acrylates, including polymethylmethacrylate, polycarbonate, polystryrene, styrene methacrylate copolymers and blends, cycloolefin polymers (e.g. ZEONEX and ZEONOR available from ZEON Chemicals L.P., Louisville, Ky.), fluoropolymers, polyesters including polyethylene terephthalate (PET), polyethylene naphthalate (PEN), and copolymers containing PET or PEN or both; polyurethanes, epoxies, polyolefins including polyethylene, polypropylene, polynorbornene, polyolefins in isotactic, atactic, and syndiotactic strereoisomers, and polyolefins produced by metallocene polymerization. In some cases, the lightguide can be elastomeric such as elastomeric polyurethanes materials and silicone based polymers, including but not limited to, polydialkylsiloxanes, silicone polyureas, and silicone polyoxamides.

In some embodiments, the lightguide is a viscoelastic lightguide as described in WO 2010/005655 A2 (Sherman et al.). In general, the viscoelastic lightguide includes one or more viscoelastic materials which exhibit both elastic and viscous behavior when undergoing deformation. Elastic characteristics refer to the ability of a material to return to its original shape after a transient load is removed. One measure of elasticity for a material is referred to as the tensile set value which is a function of the elongation remaining after the material has been stretched to twice its length and subsequently allowed to recover (destretch) under the same conditions by which it was stretched. If a material has a tensile set value of 0%, then it has returned to its original length upon relaxation, whereas if the tensile set value is 100%, then the material is twice its original length upon relaxation. Tensile set values may be measured using ASTM D412. Useful viscoelastic materials may have tensile set values of greater than about 10%, greater than about 30%, or greater than about 50%; or from about 5 to about 70%, from about 10 to about 70%, from about 30 to about 70%, or from about 10 to about 60%.

Viscous materials that are Newtonian liquids have viscous characteristics that obey Newton's law, which states that stress increases linearly with shear gradient. A liquid does not recover its shape as the shear gradient is removed. Viscous characteristics of useful viscoelastic materials include flowability of the material under reasonable temperatures such that the material does not decompose.

The viscoelastic lightguide may have properties that facilitate sufficient contact or wetting with at least a portion of a material designed to extract light from the lightguide, e.g., an optical article, such that the viscoelastic lightguide and the optical article are optically coupled. Light can then be extracted from the viscoelastic lightguide. The viscoelastic lightguide is generally soft, compliant and flexible. Thus, the viscoelastic lightguide may have an elastic modulus (or storage modulus G') such that sufficient contact can be obtained, and a viscous modulus (or loss modulus G") such that the layer does not flow undesirably, and a damping coefficient (G"/G', tan D) for the relative degree of damping of the layer. Useful viscoelastic materials may have a storage modulus, G', of less than about 300,000 Pa, measured at 10 rad/sec and a temperature of from about 20 to about 22° C. Viscoelastic properties of materials can be measured using Dynamic Mechanical Analysis according to, for example, ASTM D4065, D4440, and D5279.

In some embodiments, the viscoelastic lightguide includes a PSA layer as described in the Dalquist criterion line (as described in Handbook of Pressure Sensitive Adhesive Technology, Second Ed., D. Satas, ed., Van Nostrand Reinhold, New York, 1989.)

The viscoelastic lightguide may have a particular peel force or at least exhibit a peel force within a particular range. For example, the viscoelastic lightguide may have a 90° peel force of from about 50 to about 3000 On, from about 300 to about 3000 On, or from about 500 to about 3000 On. Peel force may be measured using a peel tester from IMASS, Marshfield, Mass.

In some embodiments, the viscoelastic lightguide includes an optically clear lightguide having high light transmittance of from about 80% to about 100%, from about 90% to about 100%, from about 95% to about 100%, or from about 98% to about 100% over at least a portion of the visible light spectrum (about 400 to about 700 nm). In some embodiments, the viscoelastic lightguide has a haze value of less than about 5%, less than about 3%, or less than about 1%. In some embodiments, the viscoelastic lightguide has a haze value of from about 0.01 to less than about 5%, from about 0.01 to less than about 3%, or from about 0.01 to less than about 1%. Haze values in transmission can be determined using a haze meter according to ASTM D1003.

In some embodiments, the viscoelastic lightguide includes an optically clear lightguide having high light transmittance and a low haze value. High light transmittance may be from about 90% to about 100%, from about 95% to about 100%, or from about 99% to about 100% over at least a portion of the visible light spectrum (about 400 to about 700 nm), and haze values may be from about 0.01% to less than about 5%, from about 0.01% to less than about 3%, or from about 0.01% to less than about 1%. The viscoelastic lightguide may also have a light transmittance of from about 50% to about 100%.

The viscoelastic lightguide may have a refractive index in the range of from about 1.3 to about 2.6, 1.4 to about 1.7, or from about 1.5 to about 1.7. The particular refractive index or range of refractive indices selected for the viscoelastic lightguide may depend on the overall design of the illumination device and the particular application in which the device may be used.

The viscoelastic lightguide material may include nanoparticles that can modify the refractive index of the viscoelastic lightguide material or to affect the mechanical properties of the viscoelastic lightguide material. Suitable nanoparticles have sizes such that the particles produce the desired effect without introducing significant amount of scattering into lightguide material.

The viscoelastic lightguide generally includes at least one polymer. The viscoelastic lightguide may include at least one pressure sensitive adhesive (PSA). PSAs are useful for adhering together adherends and exhibit properties such as: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power.

Useful PSAs are described in detailed in the Sherman et al. references cited above. Useful PSAs include poly(meth) acrylate PSAs derived from: monomer A including at least one monoethylenically unsaturated alkyl(meth)acrylate monomer, wherein a homopolymer of the monomer has a Tg of no greater than about 0° C.; and monomer B including at least one monoethylenically unsaturated free-radically copolymerizable reinforcing monomer, wherein a homopolymer of the monomer has a Tg higher than that of monomer A, for example, at least about 10° C. As used herein, (meth)acrylic refers to both acrylic and methacrylic species and likewise for (meth)acrylate.

In some embodiments, the viscoelastic lightguide includes natural rubber-based and synthetic rubber-based PSAs, thermoplastic elastomers, tackified thermoplastic-epoxy derivatives, polyurethane derivatives, polyurethane acrylate derivatives, silicone PSAs such as polydiorganosiloxanes, polydiorganosiloxane polyoxamides and silicone urea block copolymers.

In some embodiments, the viscoelastic lightguide includes a clear acrylic PSA, for example, those available as transfer tapes such as VHB™ Acrylic Tape 4910F or 4918 from 3M Company and 3M™ Optically Clear Laminating Adhesives (8140 and 8180 series).

In some embodiments, the viscoelastic lightguide includes a block copolymer dispersed in an adhesive matrix to form a Lewis acid-base pair. In some embodiments, the viscoelastic lightguide includes a stretch releasable PSA that can be removed from a substrate when stretched at or nearly at a zero degree angle.

In some embodiments the lightguide 610 may includes an additional coating or a top film having a coating on the outer surface 605. The extra coating or film may be designed to any desirable property to the surface of the lightguide. Examples of coatings include, for example, hardcoats, anti-reflective coatings, anti-soiling coatings, matte coatings, anti-fog coatings, anti-scratch coatings, privacy coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle. In some cases where the coating is provided as a film it is desirable to adhere the film to the surface 605 of the lightguide 610 with an adhesive having a refractive index that is less than the refractive index of the lightguide. Alternatively, a nanovoided layer may be disposed between the top surface 605 of the light guide 610 and the bottom of the additional top film.

As described above, lightguide 610 can be adhered to variable index light extraction layer 630 using an optically clear adhesive (OCA). In some embodiments, the OCA includes a PSA having high light transmittance of from about 80 to about 100%, from about 90 to about 100%, from about 95 to about 100%, or from about 98 to about 100% over at least a portion of the visible light spectrum (about 400 to about 700 nm), and/or a haze value of from about 0.01 to less than about 5%, from about 0.01 to less than about 3%, or from about 0.01 to less than about 1%.

In some embodiments, useful PSAs include those described in the Dalquist criterion line (as described in Handbook of Pressure Sensitive Adhesive Technology, Second Ed., D. Satas, ed., Van Nostrand Reinhold, New York, 1989.) The PSA may have a particular peel force or at least exhibit a peel force within a particular range. For example, the PSA may have a 90° peel force of from about 10 to about 3000 g/in, from about 300 to about 3000 g/in, or from about 500 to about 3000 g/in. Peel force may be measured using a peel tester from IMASS, Marshfield, Mass.

The OCA may have a refractive index in the range of from about 1.3 to about 2.6, 1.4 to about 1.7, or from about 1.5 to about 1.7. The particular refractive index or range of refractive indices selected for the OCA may depend on the overall design of an optical film including the lightguide and the variable index light extraction layer. In general the OCA should have a refractive index approximately equal to or greater than that of the lightguide, and between that of the first and second regions of variable index light extraction layer 630.

The PSA used as the OCA may include any of the materials described above for the viscoelastic lightguide. Additional exemplary OCAs that are PSAs include tackified thermoplastic epoxies as described in U.S. Pat. No. 7,005,394 (Ylitalo et al.), polyurethanes as described in U.S. Pat. No. 3,718,712 (Tushaus), polyurethane acrylates as described in US 2006/0216523 (Shusuke). In some embodiments, the adhesive includes a clear acrylic PSA, for example, those available as transfer tapes such as VHB™ Acrylic Tape 4910F and 4918 from 3M Company, 3M™ Optically Clear Laminating Adhesives (8140 and 8180 series) and 3M™ Optically Clear Laminating Adhesives 8171 CL and 8172 CL) described in WO 2004/0202879. Useful OCAs are also described in US 2011/0039099 (Sherman et al.). In some embodiments, the OCA may include a PSA having a microstructured adhesive surface to allow for air bleed upon application to the surface of the lightguide as described, for example, in US 2007/0212535 (Sherman et al.).

The adhesive may include a stretch releasable PSA. Stretch releasable PSAs are PSAs that can be removed from a substrate if they are stretched at or nearly at a zero degree angle. In some embodiments, the adhesive or a stretch release PSA used as in the optical tape has a shear storage modulus of less than about 10 MPa when measured at 1 rad/sec and −17° C., or from about 0.03 to about 10 MPa when measured at 1 rad/sec and −17° C. Stretch releasable PSAs may be used if disassembling, reworking, or recycling is desired.

In some embodiments, the stretch releasable PSA may include a silicone-based PSA as described in U.S. Pat. No. 6,569,521 B1 (Sheridan et al.) or U.S. Provisional Application No. 61/020,423 (63934US002, Sherman et al.) and 61/036,501 (64151US002, Determan et al.). Such silicone-based PSAs include compositions of an MQ tackifying resin and a silicone polymer. For example, the stretch releasable PSA may include an MQ tackifying resin and an elastomeric silicone polymer selected from the group including urea-based silicone copolymers, oxamide-based silicone copolymers, amide-based silicone copolymers, urethane-based silicone copolymers, and mixtures thereof.

In some embodiments, the stretch releasable PSA may include an acrylate-based PSA as described in WO 2010/078346 (Yamanaka et al.) and WO 2010/077541 (Tran et al.) Such acrylate-based PSAs include compositions of an acrylate, an inorganic particle and a crosslinker. These PSAs can be a single or multilayer.

In some embodiments the adhesive layer may include the cured reaction product of a multifunctional ethylenically unsaturated siloxane polymer and one or more vinyl monomers as described in U.S. Pat. No. 7,862,898 (Sherman et al.) and U.S. Pat. No. 7,892,649 (Sherman et al.).

In some embodiments the use of self-wetting adhesives as described in WO 2010/132176 (Sherman et al.) and WO 2009/085662 (Sherman et al.) is beneficial in placement of the illumination device 600 onto a reflective scattering element.

An exemplary PSA includes a polymer derived from an oligomer and/or monomer including polyether segments, wherein from 35 to 85% by weight of the polymer includes the segments. These adhesives are described in US 2007/0082969 A1 (Malik et al.). Another exemplary PSA includes the reaction product of a free radically polymerizable urethane-based or urea-based oligomer and a free radically polymerizable segmented siloxane-based copolymer; these adhesives are described in U.S. Provisional Application 61/410,510 (Tapio et al.).

The PSA can optionally include one or more additives such as nanoparticles, plasticizers, chain transfer agents, initiators, antioxidants, stabilizers, viscosity modifying agents, and antistats.

In some embodiments, a seal layer is disposed over the patterned, nanovoided low-index layer to create the variable index light extraction layer. The seal lay can be used to minimize penetration of contaminants into the nanovoided layer. For example, a seal layer may be disposed over and between the patterned low-index regions thus forming the variable index light extraction layer such that the seal layer is in between the region including the patterned index region (variable index region 100 in FIG. 1c) and an adhesive layer. For another example, a seal layer may be disposed over the patterned low-index layer forming the variable index light extraction layer such that it is in between the patterned index region and the lightguide, and the seal layer has a refractive index that is approximately equal to or greater than that of the lightguide.

Suitable seal layers include pressure sensitive adhesive polymers and copolymers, which can be acrylic or acrylate based, styrene butadiene, or styrene isoprene type copolymer thermoplastic resins and similar polymers so long as they do not contain a significant fraction of low molecular weight species capable of penetration into the nanovoided first region. Other polymer seal layers can be heat activated adhesive polymers including acrylics, acrylic-vinyl acetate, copolymers, block copolymers, EVA copolymers, polyamides, polyesters, polyethylene polymers and copolymers, polyisobutylene, polypropylene polymers and copolymers, polyurethane polymers and copolymers and other polymers including Surlyn plastic, vinyl acetate, and polyvinylidene fluoride polymers, their alloys, copolymers and derivatives with acid salt groups. These materials can be laminated with a direct film lamination, applied by melt coating or coated from an aqueous or solvent borne emulsion or dispersion of the polymer by any suitable coating method. Two example of suitable polymeric dispersions useful as seal layers are NEOCRYL A-614 and NEOPAC R-9699 (available from DSM, Heerlen, Netherlands). Seal layers may also include curable resin systems that may be overcoated and cured such that the resin components do not penetrate the nanovoids of the nanoporous low-index regions.

The light source is optically coupled to the lightguide such that at least some of the light from the light source can enter the lightguide. For example, a light source may be optically coupled to the lightguide such that greater than 1%, greater than 10%, greater than 20%, greater than 30%, greater than 40%, greater than 50%, greater than 90%, or about 100% of light emitted by the light source enters the lightguide. For another example, a light source may be optically coupled to the lightguide such that from about 1% to about 10%, from about 1% to about 20%, from about 1% to about 30%, from about 1% to about 40%, from about 1% to about 50%, from about 1% to about 100%, from about 1% to about 100%, from about 50% to about 100%, or from about 1% to about 100% of light emitted by the light source enters the lightguide. The light source may emit light having a random or a particular angular distribution.

The light source may include any suitable light source. Exemplary light sources include linear light sources such as cold cathode fluorescent lamps and point light sources such as light emitting diode (LEDs). Exemplary light sources also include organic light-emitting devices (OLEDs), incandescent bulbs, fluorescent bulbs, halogen lamps, UV bulbs, infrared sources, near-infrared sources, lasers, or chemical light sources. In general, the light emitted by the light source may be visible or invisible. At least one light source may be used. For example, from 1 to about 10,000 light sources may be used. The light source may include a row of LEDs positioned at or near an edge of the lightguide. The light source may include LEDs arranged on a circuit such that light emitted from the LEDs lights up continuously or uniformly the lightguide throughout a desired area. The light source may include LEDs that emit light of different colors such that the colors can mix within the lightguide.

"LED" refers to a diode that emits light, whether visible, ultraviolet, or infrared. It includes incoherent encased or encapsulated semiconductor devices marketed as "LEDs," whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light.

An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies.

Multicolored light sources, whether or not used to create white light, can take many forms in a light assembly, with different effects on color and brightness uniformity of the light guide output area or surface. In one approach, multiple LED dies (e.g., a red, a green, and a blue light emitting die) are all mounted in close proximity to each other on a lead frame or other substrate, and then encased together in a single encapsulant material to form a single package, which may also include a single lens component. Such a source can be controlled to emit any one of the individual colors, or all colors simultaneously. In another approach, individually packaged LEDs, with only one LED die and one emitted color per package, can be clustered together for a given recycling cavity, the cluster containing a combination of packaged LEDs emitting different colors such as blue/yellow, red/green/blue, red/green/blue/white, or red/green/blue/cyan/yellow. Amber LEDs can also be used. In still another approach, such individually packaged multicolored LEDs can be positioned in one or more lines, arrays, or other patterns.

If desired, other visible light emitters such as linear cold cathode fluorescent lamps (CCFLs) or hot cathode fluorescent lamps (HCFLs) can be used instead of or in addition to discrete LED sources as illumination sources for the disclosed backlights. In addition, hybrid systems such as, for example, (CCFL/LED), including cool white and warm white, CCFL/HCFL, such as those that emit different spectra, may be used. The combinations of light emitters may vary widely, and include LEDs and CCFLs, and pluralities such as, for example, multiple CCFLs, multiple CCFLs of different colors, and LEDs and CCFLs. The light sources may also include lasers, laser diodes, plasma light sources, or organic light emitting diodes, either alone or in combination with other types of light sources, e.g., LEDs.

For example, in some applications it may be desirable to replace the row of discrete light sources with a different light source such as a long cylindrical CCFL, or with a linear surface emitting light guide emitting light along its length and coupled to a remote active component (such as an LED die or halogen bulb), and to do likewise with other rows of sources. Examples of such linear surface emitting light guides are disclosed in U.S. Pat. No. 5,845,038 (Lundin et al.) and U.S. Pat. No. 6,367,941 (Lea et al.). Fiber-coupled laser diode and other semiconductor emitters are also known, and in those cases the output end of the fiber optic waveguide can be considered to be a light source with respect to its placement in the disclosed recycling cavities or otherwise behind the output area of the backlight. The same is also true of other passive optical components having small emitting areas such as lenses, deflectors, narrow light guides, and the like that give off light received from an active component such as a bulb or LED die. One example of such a passive component is a molded encapsulant or lens of a side-emitting packaged LED. Any suitable side-emitting LED can be used for one or more light sources, e.g., Luxeon™ LEDs (available from Lumileds, San Jose, Calif.), or the LEDs described, e.g., in U.S. Pat. No. 7,525,126 (Leatherdale et al.) and US 2007/0257270 (Lu et al.).

Light which enters the lightguide can be collimated such that it is incident on an interface between the lightguide and another medium at angles less than 50 degrees, less that 40 degrees, less than 30 degree, less than 20 degree or less than 10 degrees, where the incident angles are measured in respect to the surface normal of the lightguide injection interface. There are many ways to produce collimated light including but not limited to: 1. provide an LED light source or sources with highly collimating lenses; 2. provide an LED light source or sources that are disposed inside of a reflective wedge, where the wedge has an interior angle of less than 20 degrees, less than 15 degrees or less than 10 degrees; 3. provide an LED light source or sources where the LED light sources are disposed at approximately the focal point of a compound parabolic concentrator designed to collimate the light to desired injection angles; 4. provide an LED light source or sources where emission is perpendicular to the plane of the lightguide and the light is incident on a half parabolic mirror which is designed to collimate the light injected into the lightguide; and 5. provide an LED light source or sources disposed to emit light at the surface of the lightguide, which has a surface relief structure to allow light to enter the lightguide only at supercritical angles.

In general, reflective scattering element 650 can include a wide variety of materials, assemblies and/or devices. In general, reflective scattering element 650 is designed to take light delivered from the variable index light extraction layer 630 and reflect it back through the extraction layer and through outer surface 605 of lightguide 610. The reflective scattering element 650 may be chosen such that the desired light distribution is emitted through outer surface 605 of the lightguide 610. In some cases reflective scattering element 650 is chosen such that the light incident on reflective scattering element 650 is transformed into a substantially Lambertian area light source.

In general, an element is considered a reflective scattering element if exhibits diffuse or semispecular reflection. Diffuse reflection is the reflection of light from a surface such that an incident ray is reflected at many angles rather than at just one angle as in the case of specular reflection. An illuminated ideal diffuse reflecting surface will have equal luminance from all directions in the hemisphere surrounding the surface (Lambertian reflectance). Semi-specular is the reflection of light from a surface such that an incident ray is reflected at multiple angles rather than at just one angle as in the case of a specular reflector. In many cases a semi-specular reflector has predominantly forward scattering where the reflected light is spread around the specular reflected angle with at least greater than 5% of the reflected light being outside of a 2 degree come centered around the specular angle. In some cases greater than about 50% of light incident from any angle is reflected outside of a 2 degree cone centered around the incident angle. Suitable materials for reflective scattering element 650 include diffuse reflective and semispecular reflective materials and surfaces. Reflecting scattering elements as defined herein have either diffuse reflection or semispecular reflection. For diffuse reflective materials, a single incident light ray having an angle of incidence is reflected at many angles rather than at just one angle as in the case of specular reflection. An illuminated ideal diffuse reflecting surface will have equal luminance from all directions in the hemisphere surrounding the surface (Lambertian reflectance). Generally, a diffuse reflective material, reflects light such that rays are scattered in both forward and backward directions (backward scattering means that light is directed back toward the direct from which it came). A semispecular reflective material is a material that provides diffuse reflection, but for a single incident ray of light, the reflected rays of light are reflected within a narrow range of angles. Generally, the light reflect from a semi-specular reflective material is forward directed and a minority of the light is reflected backward to the direction from which it was incident. In some cases for the invention described herein, reflective scattering element 650 provides diffuse reflection for the light delivered from the lightguide such that greater than 10% of the reflected light is outside of the range of angles defined by the range of angles of the incident light.

Suitable reflective scattering elements include any scattering material, for example, plaster, white paper, fibrous materials like non-woven fiber mats and cloth, inorganic filled white reflective polymers (inorganic particle filled polymers such as polyesters, polyolefins, and the like), ceramic materials, crystalline surfaces (for example marble, natural quartz or stone), and voided polymer materials (for example those made using phase separation techniques such as solvent induced phases separation and thermal induced phase separation). Any voided polymeric materials may be suitable as a reflective scattering element. In some embodiments, the reflective scattering element includes a graphic such as a sign, marking or picture. Examples of semi-specular reflective scattering materials include rough reflective metal surface, structured specularly reflective surfaces, specularly reflective surfaces having diffuse coatings over the specularly reflective surface (for example, an enhanced specular reflector such as Vikuiti™ ESR from 3M Co. which includes a multilayer optical film having a diffuse coating on a surface thereof). Some examples include brushed aluminum and chrome, metals surfaces that have been modified by embossing, "peening", physical or chemical etching, or any other method that imparts a surface roughness. Alternatively, a diffusive coating could be applied on, or placed as a free-standing element over a specular reflector. A film having a surface structure or roughness could be placed over or laminated to a specular material. The reflective scattering element can take the form of inks, paint, or coatings. Printed graphics made by such methods as digital printing, silk screen, etc. are reflective scattering elements. A painted wall is a reflective scattering element.

For purposes of this disclosure, a reflective scattering element may also include any element where the surface reflection deviates from the specular reflection in any fashion, including structured specularly reflective surfaces. For example, prism, pyramid, or structured surfaces relying on TIR surface reflection may be suitable for use as a reflective scattering element. In some cases where the reflective scattering element is enabled by TIR reflection, the reflective scattering element and/or the entire optical stack may be transparent to external light. Prism, pyramid, or other structured surfaces in combination with reflective surfaces or layers such as metal coatings, dielectric coatings, or multilayer reflectors may also be suitable for use as a reflective scattering element. Diffractive structures used in combination with reflective surfaces or layers may also be suitable for use as a reflective scattering element.

As mentioned above, lightguide 610 and reflective scattering element 650 are optically coupled with the top and bottom surfaces, 625 and 635 respectively, of the variable index light extraction layer. This optical coupling in many cases means that there are no air gaps between variable index light extraction layer 630, lightguide 610 and reflective scattering element 650.

Two-pass systems illustrated generally by FIG. 6 may be used for lighting reflective displays. Because reflective displays do not generate their own light, it can be difficult or impossible to read images in the dark or in low-light environments. A two-pass system, that is, generally front-lit applications of the variable index light extraction layer of the present disclosure, may provide the required illumination to view the display through a transparent and non-distorting front surface. Suitable reflective displays are described, for example, in U.S. Patent Application Ser. No.

61/446,740, entitled "Front-Lit Reflective Display Device and Method of Front-Lighting Reflective Display," and filed Feb. 25, 2011.

Other two-pass system applications of the variable index light extraction layer of the present disclosure include illuminating signs, displays, or graphics. Further, a two-pass system may be used for a lamp, a luminaire, or for general or decorative lighting, as in architectural, automotive, or aviation applications. Two-pass systems may also be configured to be backlit systems, for example, the output surface of the film using the variable index light extraction layer of the present disclosure may be used to illuminate a reflective scattering element, graphic or display. Suitable reflective scattering elements are described in U.S. Patent Application Ser. No. 61/446,712, entitled "Illumination Article and Device for Front-Lighting Reflective Scattering Element," and filed Feb. 25, 2011.

Figure 7:
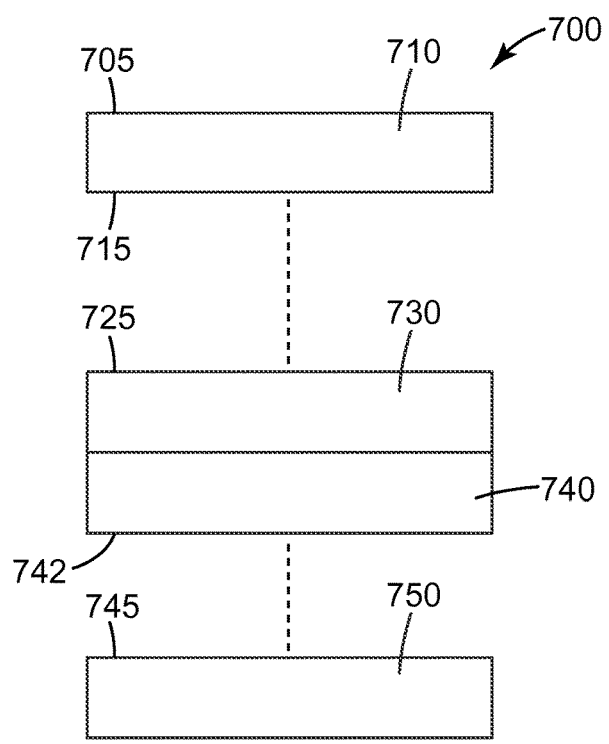
FIG. 7 is another exploded cross-sectional elevation view of an optical stack including the variable index light extraction layer of FIG. 1a or FIG. 1c.

FIG. 7 shows a schematic of an exemplary optical stack 700 including the variable light extraction layer in combination with a reflective scattering element. In this embodiment, variable index light extraction layer 730 is made on transparent substrate 740 which is incorporated into the illumination assembly. Surface 725 of variable index light extraction layer 730 is optically coupled to lightguide 710, and bottom side 742 of transparent substrate 740 is optically coupled to reflective scattering element 750. Suitable transparent substrates are described above.

In many cases optical coupling between variable index light extraction layer 730 and lightguide 710 and reflective scattering element 750 means that there are no air gaps in between the surfaces of the layers (i.e. there are no air gaps between surfaces 715 and 725 and no air gaps between surfaces 742 and 745). Surface 742 of transparent substrate 740 can be adhered to surface 745 of reflective scattering element 750 using any means for example by using an optically clear pressure sensitive adhesive. Transparent substrate 740 may have some level of haze and can provide some light scattering, as long as the scattered light is predominantly in the forward direction toward reflective scattering element 750.

Figure 8:
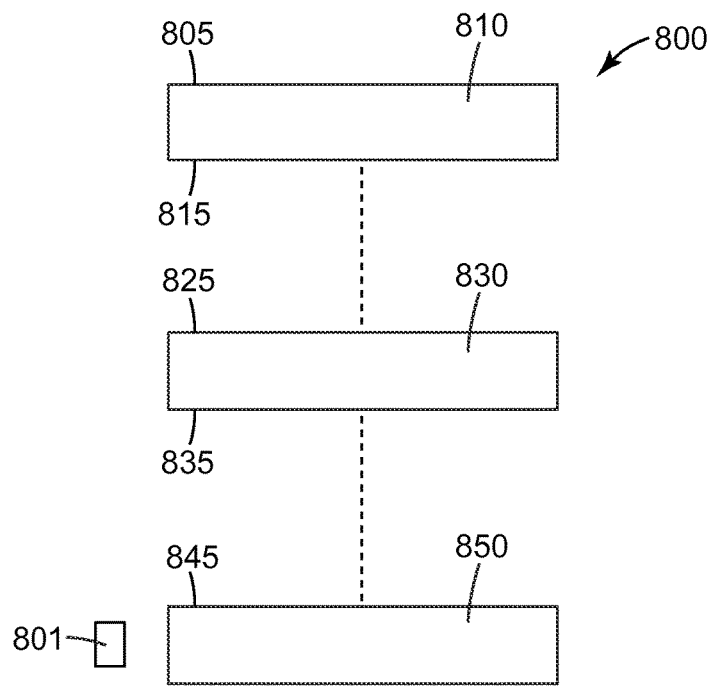
FIG. 8 is an exploded cross-sectional elevation view of another optical stack including the variable index light extraction layer of FIG. 1a or FIG. 1c.

FIG. 8 is an exploded cross-sectional elevation view of another optical stack including the variable index light extraction layer of FIG. 1a or FIG. 1c. Lightguide 850 having a surface 845 is optically coupled to a first major surface 835 of light extraction film 830. In some embodiments, the lightguide 850 may be affixed or laminated to light extraction film 830 by a pressure sensitive or optically clear adhesive. In some embodiments, the adhesive may contain pigment or diffusing elements. In other embodiments, light extraction film 830 may be formed directly on lightguide 850; that is, the substrate 120 in FIG. 1c is itself lightguide 850.

Light is injected into the lightguide 850 by one or more light sources 801. Any suitable light source or combination of light sources, described in detail above, may be used. Suitable injection optics may be used if the one or more light sources 801 are external to the lightguide 850. Though the configuration of one or more light sources 801 and lightguide 850 suggest an edge-lit embodiment, direct-lit embodiments, where the one or more light sources 801 are disposed behind the lightguide 850, are possible and may be suitable or preferable in some applications.

A second major surface 825 of light extraction film 830, opposite the lightguide 850, is optically coupled to a surface 815 of transmission layer 810, which includes an output surface 805. Transmission layer 810 may be any suitable element or combination of elements that redirect, diffuse, or scatter light. Alternatively, transmission layer 810 may simply be a transparent substrate to protect the components of the system or to add dimensional stability or prevent warping. Suitable elements include prism films, transparent polymeric materials, graphics, displays, polarizers, turning films, transflective films, forward scattering films, diffusers (including volume diffusers, partial diffusers, or transmissive diffuser film), or any other element that may impart a desired optical effect, generate a desired image or pattern, or direct light with desired optical characteristics through output surface 805. Transmission layer 810 may be attached to the light extraction film 830 using any suitable method or materials, including pressure sensitive adhesives. Suitable configurations and constructions of transmission layers are described, for example, in U.S. Patent Application Ser. No. 61/485,881, entitled "Back-Lit Transmissive Display Having Variable Index Light Extraction Layer," and filed May 13, 2011.

One-pass systems illustrated generally by FIG. 8 may be used for a variety of applications. Applications of the system include providing general lighting, as in lamps or luminaires, or decorative lighting, as in architectural, automotive, or aviation applications or displays whether traditional displays like liquid crystal displays, transmissive liquid crystal displays, and transparent display panels. One-pass systems may also be utilized to illuminate signs, displays or other graphics. Further assemblies and applications are described, for example, in U.S. Patent Application Ser. No. 61/446,740, entitled "Front-Lit Reflective Display Device and Method of Front-Lighting Reflective Display," and filed Feb. 25, 2011.

In some embodiments, FIG. 8 may also represent a hybrid of one- and two-pass systems. Particularly in embodiments where a significant portion of light is reflected, scattered, or otherwise redirected back through light extraction film 830 by, for example, transmission film 810 including a volume diffuser, a partial diffuser, a transmissive diffuser film or a transflective film, optical stack 800 may exhibit properties or be suitable for applications of either or both of one- or two-pass systems.

Figure 9A:
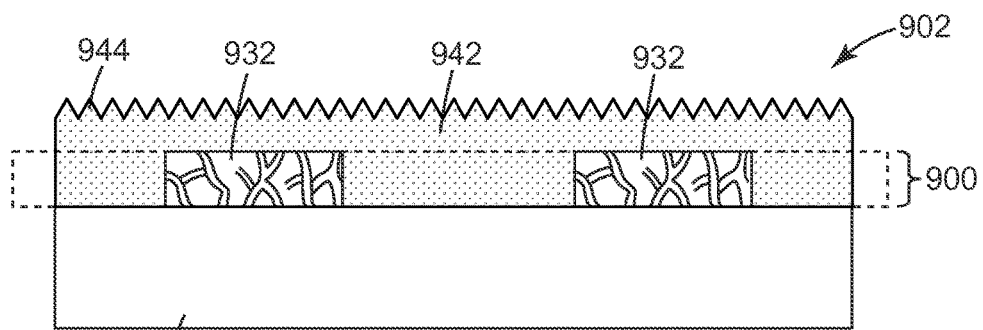
FIG. 9a is a cross-sectional elevation view of a variable index light extraction layer having a plurality of microstructures.

FIG. 9a is a cross-sectional elevation view of a variable index light extraction layer having a plurality of microstructures. Variable index light extraction layer 902 includes variable index region 900, corresponding with variable index light extraction layer 102 and variable index region 100 of FIG. 1c. First material 932 and second material 942 are patterned on substrate 920, forming region 900 which may extract light from an optically coupled lightguide based on the geometric arrangement of the first and second regions. Microstructures 944 are disposed on a major surface of the variable light extraction layer opposite the substrate. In some embodiments, microstructures 944 are formed directly on second material 944, as illustrated in FIG. 9a. In other embodiments, the major surface of the variable light extraction layer opposite the substrate is optically coupled to a film or surface having microstructures 944. Microstructures may be refractive or diffractive and may be designed to impart desired characteristics on exiting light; for example, microstructures 944 may diffuse, diffract, or turn light.

Figure 9B:
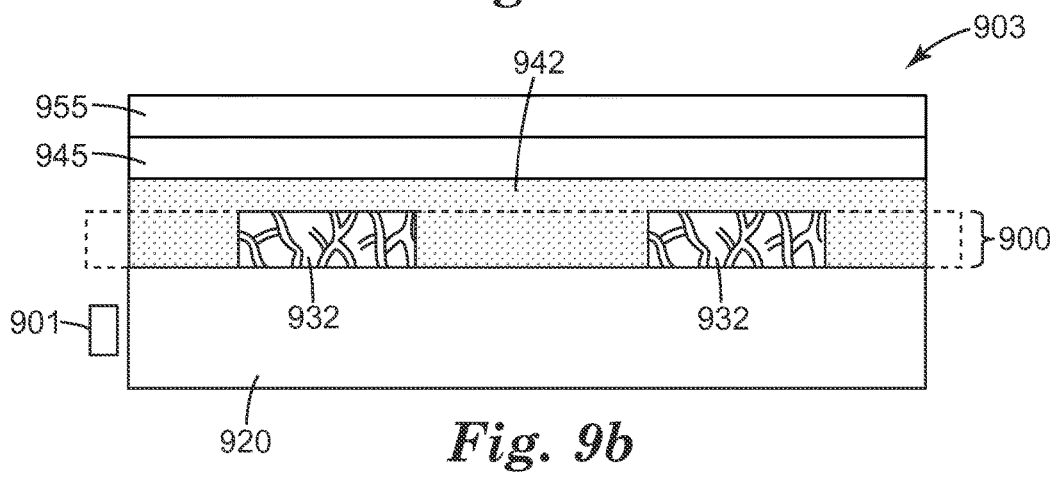
FIG. 9b is a cross-sectional elevation view of an optical stack including a variable index light extraction layer and a reflective scattering element.

FIG. 9b is a cross-sectional elevation view of a particular construction of an optical stack including a variable index light extraction layer and a reflective scattering element. Optical stack 903 includes variable index light extraction layer 900 including first material 932 and second material 942, lightguide 920, functioning also as a substrate, is disposed to receive light from one or more light sources 901, adhesive 945, and reflective scattering element 955. In some embodiments, second material 942 may itself be an adhesive, which may eliminate much of the need or desirability for a separate adhesive. Reflective scattering element 955 may be any suitable material or even a reflective display, including an electrophoretic display panel or microcavitated polyethylene terephthalate.

Figure 9C:
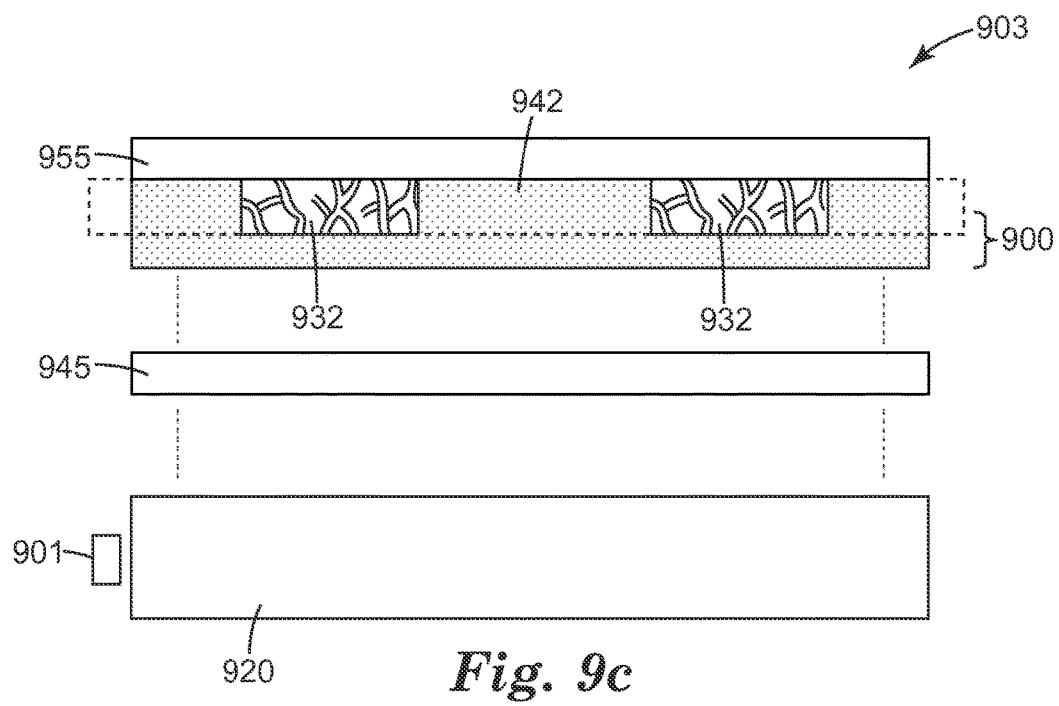
FIG. 9c is an exploded cross-sectional elevation view of another optical stack including a variable index light extraction layer and a reflective scattering element.

FIG. 9c is cross-sectional elevation view of another construction of an optical stack including a variable index light extraction layer and a reflective scattering elements. Optical stack 903 includes variable index light extraction layer 900 including first material 932 and second material 942, lightguide 920 disposed to receive light from one or more light sources 901, adhesive 945, and reflective scattering element 955, also functioning as a substrate for the variable index light extraction layer 900. In some embodiments, second material 942 may itself be an adhesive, which may eliminate much of the need or desirability for a separate adhesive layer. Reflective scattering element 955 may be any suitable material or even a reflective display, including an electrophoretic display panel or microcavitated polyethylene terephthalate.

Figure 9D:
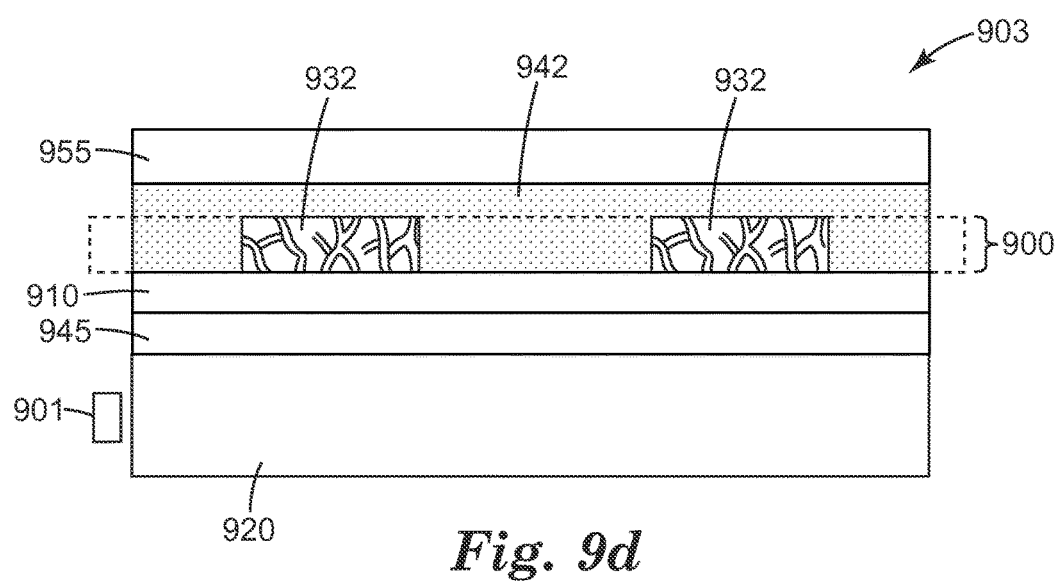
FIG. 9d is a cross-sectional elevation view of another optical stack including a variable index light extraction layer and a reflective scattering element.

FIG. 9d is another construction of an optical stack including a variable index light extraction layer and a reflective scattering element. Optical stack 903 includes variable index light extraction layer 900 including first material 932 and second material 942, substrate 910, lightguide 920 which is disposed to receive light from one or more light sources 901, adhesive 945, and reflective scattering element 955. Reflective scattering element 955 may be any suitable material or even a reflective display, including an electrophoretic display panel or microcavitated polyethylene terephthalate.

EXAMPLES

The following materials were used as received.

| Component | % Solid | Amount (g) |
|---|---|---|
| A-174 treated Silica Nalco 2327, Ondeo Nalco Chemical Co. in 1-methoxy-2-propanol | 44.70 | 434.88 |
| Aliphatic Urethane Acrylate, available from Sartomer Corporation as CN 9893 | 100.00 | 38.83 |
| Pentaerythritol Triacrylate, available from Sartomer Corporation as SR 444 | 100.00 | 155.5 |
| 1-methoxy-2-propanol, available from Fisher Scientific | — | 30.39 |
| Ethyl Acetate, available from Sigma-Aldrich | — | 58.25 |
| Photoinitiator, available from BASF Corporation as IRGACURE 184 | 100.00 | 3.495 |
| Photoinitiator, available from BASF Corporation as IRGACURE 819 | 100.00 | 1.151 |

Preparation of Reactive Nanoparticles

In a 2 liter three-neck flask, equipped with a condenser and a thermometer, 960 grams of ONDEO NALCO 2327 silica nanoparticles (a 40% by weight solution of nominally 20 nm silica nanoparticles in water, available from Nalco, Naperville, Ill.) and 400 grams of 1-methoxy-2-propanol were mixed under rapid stirring. To the stirring solution was added 59.1 grams of Silquest A-174 silane (available from GE Advanced Materials, Wilton, Conn.). The A-174 silane was added slowly over 15-20 minutes and the resulting mixture was stirred for 30 minutes.

The mixture was heated at 80 degrees centigrade for 20 hours, and then was allowed to cool to room temperature. The water and a portion of the 1-methoxy-2 propanol was removed under vacuum from the solution using a rotary evaporator with a 40 degrees centigrade water-bath. The resulting concentrated solution, 44.7% by weight A-174-modified silica nanoparticles in 1-methoxy-2-propanol was clear dispersion with a bluish tint.

Preparation of Coating Formulation 1

The following were added in a 1-liter wide-mouth amber bottle, according to the amounts shown in the above table: 38.83 g of CN 9893, 155.50 g of SR 444, 58.25 g of ethyl acetate and 30.39 g of 1-methoxy-2-propanol. The bottle was capped and shaken for 2 hours to dissolve CN9893 (batch is clear). This solution is referred to as Resin Premix.

The following were added to a 2000 mL poly bottle: 434.88 g of A-174 treated NALCO 2327 and the Resin Premix. The two components were mixed by transferring the batch back and forth between the two bottles, the transfers ending with the batch in the 2000 mL bottle. To the 2000 mL bottle was added 3.495 g of IRGACURE 184 and 1.151 g IRGACURE 819. The solution was shaken for 30 minutes to dissolve photoinitiators. The resulting coating formulation was a translucent, low-viscosity dispersion with ~54.4% solids by weight in solvent.

Preparation of Coating Formulation 2:

100 g of stock coating formulation above was diluted to ~40% solids by weight with a 4.61:1 ratio by weight of 1-methoxy-2propanol to ethyl. Additional IRGACURE 819 was added to the solution such that the total amount of IRGACURE 819 by weight was 0.23%.

Example 1

Flexographic Printing of Nanoporous Patterned Low Index Layer

The above coating formulation 1 was used to print onto a 50 µm PET film (MELINEX 617 available from DuPont, Wilmington, Del.) using a flexographic printing process at a speed of 15 meters per minute. The coating solution was applied to an anilox roll (sized to ~36.2 bcm/in$^2$, the cells cut with a trihelical geometry) targeting a wet thickness of ~4-6 microns. The coating solution was then transferred from the anilox roll to the flexographic printing stamp (in this example a flat stamp with 4 inch by 14 inch area). The coating solution on the flexographic stamp was then transferred to speed matched moving PET substrate via direct contact. The printed and patterned coating solution with solvent still present then traveled ~10 feet to a UV curing unit and was partially cured using UV radiation with a wavelength of 385 nm and dose of ~300 mJ/cm$^2$ under a nitrogen atmosphere with <200 ppm oxygen. The UV curing unit consisted of an array of 120 LEDs arranged with 20 LEDs across the web and 8 LEDs in the web direction where rows of LEDs are staggered across in the cross-web direction (UV LEDs available from Nichia, model #NCCU001). The partially cured coating was then dried at 70° C. in a 5 meter oven, and under a nitrogen-purged atmosphere, and was finally cured with a 236 Watt/cm$^2$ FUSION H bulb (available from Fusion UV Systems, Inc., Gaithersburg, Md.). The resulting nanovoided polymeric layer had a thickness of approximately 3 um. The transmission was >94%, the haze was <3% and the clarity was >96%% as measured using a BYK Gardner HAZE-GARD PLUS (Columbia, Md.). The refractive index of the nanovoided layer was between 1.34 and 1.38 as measured using a METRI-CON Prism Coupler (Metricon Corporation, Pennington, N.J.).

Example 2

Gravure Printing of Nanoporous Patterned Low Index Layer

Coating formulation 2 was used to print onto a 50 um PET film (MELINEX 617 available from DuPont, Wilmington, Del.) using a direct gravure printing process at a speed of 10 meters per minute. The coating solution was applied to a patterned gravure print roll. The gravure roll was 8.0 bcm/in$^2$ with hexagonal cell cut with a 60° angle and a line screen of 200 lines/inch and was manufactured by Interflex Laser Engravers (Spartanburg, S.C.). The coating solution was applied to the gravure roll and the excess ink was removed from the unpatterned regions with a doctor blade. The features on the gravure roll were a series of parallel lines where the lines comprised ~3.5 mm diameter diamond shaped patterns linked with lines with a width of ~1.5 mm. The array of lines had approximately a 6.5 mm pitch. The coating solution was then transferred to speed matched moving PET substrate via direct contact. The printed and patterned coating solution with solvent still present then traveled ~2 feet to a UV LED curing unit and was partially cured using UV radiation with a wavelength of 385 nm and dose of ~300 mJ/cm$^2$ under a nitrogen atmosphere with <200 ppm oxygen (UV LED curing unit described in example 1 above). The partially cured coating was then dried at 90° C. in a 5 meter oven, and under a nitrogen-purged atmosphere, and was finally cured with a 236 Watt/cm$^2$ FUSION H bulb (available from Fusion UV Systems, Inc., Gaithersburg, Md.). The resulting patterned nanovoided polymeric layer had a thickness of approximately 3 um. The patterned nanoporous features had refractive indices 1.34 and 1.38 as measured using a METRICON Prism Coupler (Metricon Corporation, Pennington, N.J.).

Example 3

Fabrication of Optical Device with Reflective Scattering Element

Figure 10:
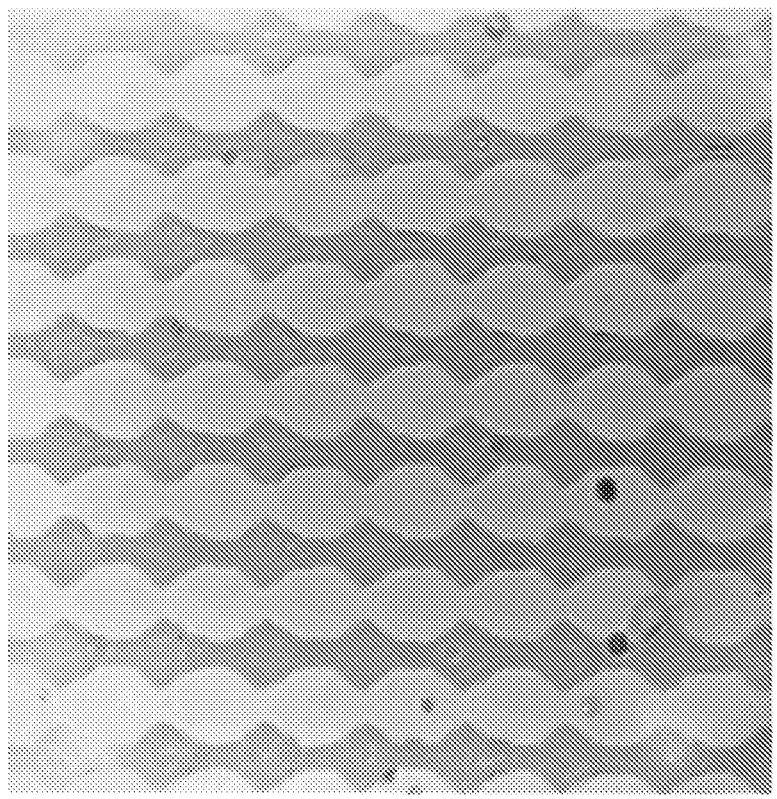
FIG. 10 is an image of the selective extraction of guided mode light by a variable index light extraction layer.

An optical or illumination device corresponding to the configuration described in FIG. 9d was made using the following process. The printed and patterned low-index layer from example 2 was laminated to a reflective white film (Micro-cavitated PET, CRISPER 5 mil K2323 available from Sanyo Corp. of America) with a 1 mil adhesive (3M Optically Clear Adhesive 8171). The adhesive filled the spaces between the patterned low index regions to form the variable index light extraction layer. This laminated film was further attached to a 90 mm×120 mm acrylic lightguide using an additional layer of 1 mil adhesive (3M Optically Clear Adhesive 8171). In this construction, the printed low-index layer was in between the lightguide and the reflective white film. A linear array of LEDs (Nichia, NCSL119T-H1 available from Nichia, Tokushima, Japan) was then used to inject light into the edge of the acrylic lightguide, and a PROMETRIC camera (available from Radiant Imaging, Inc., Duvall, Wash.) was used to evaluate the illumination device (viewing through the lightguide) and the contrast between non-printed area and printed areas exhibited a contrast ratio of greater than 2:1. A picture of the illuminated device is shown in FIG. 10.

Example 4

Fabrication of Illumination Device with Transmissive Diffuser Film

The printed and patterned low-index layer was then laminated to a surface diffuser film (Keiwa BS-42 available from Keiwa Inc., Tokyo, Japan) with a 1 mil adhesive (3M Optically Clear Adhesive 8171). The adhesive filled the spaces between the patterned low-index regions to form the variable index light extraction layer. This laminated film was further attached to a 90 mm×120 mm acrylic lightguide using an additional layer of 1 mil adhesive (3M Optically Clear Adhesive 8171). In this construction, the printed low-index layer was in between the lightguide and the surface diffuser film. A linear array of LEDs (Nichia, NCSL119T-H1) was then used to inject light into the edge of the acrylic lightguide, and a PROMETRIC camera (available from Radiant Imaging, Inc., Duvall, Wash.) was used to evaluate the illumination device (viewing through the surface diffuser) and the contrast between non-printed area and printed areas exhibited a contrast ratio of greater than 2:1.

Example 5

Fabrication of Multipitch Diffractive Film

A precision diamond turning machine was used to cut a spiral-shaped groove pattern, which became the diffractive surface features in the lighting device after replication, into the copper surface of a cylindrical tool. The diamond was shaped so that the grooves had a sawtooth (asymmetric) profile in cross section, with a height-to-pitch ratio of about 1:1. During cutting, the groove pitch of the spiral was cycled between six specific values (315 nm, 345 nm, 375 nm, 410 nm, 445 nm, and 485 nm) to produce groove packets which formed nested annular regions that bordered each other but did not overlap with each other. Each annular region was a groove packet of constant pitch, and each set of six adjacent annular regions formed a repeating group or set of groove packets. The spiral pattern had an overall diameter of about 8 inches (about 20 centimeters). The radial dimensions or widths of the annular regions were selected so that the aggregate area for all of the six pitch values was the same. That is, the area of the entire grooved pattern was about 314 cm$^2$ ($\pi r^2$, where r≈10 cm), and the aggregate area for grooves having the 315 nm pitch was about 314/6≈52 cm$^2$, and the aggregate areas for grooves having each of the other five pitches was also about 52 cm$^2$. The annular regions were relatively narrow as measured radially, the maximum such dimension being about 150 micrometers.

The grooved surface of the resulting copper tool was then replicated in a thin flexible light-transmissive film using a cast-and-cure technique. This was done by coating the grooved surface of the copper tool with an organic phosphonic acid release layer (commonly known to those skilled in the art), and casting an acrylate resin composition against the coated precision tool using a transparent polyethylene terephthalate (PET) support film having a thickness of about 5 mils (about 125 micrometers). The acrylate resin composition included acrylate monomers (75% by weight PHOTOMER 6210 available from Cognis and 25% by weight 1,6-hexanedioldiacrylate available from Aldrich Chemical Co.) and a photoinitiator (1% by weight Darocur 1173, Ciba Specialty Chemicals). The resin composition was then cured using ultraviolet light. This resulted in a microreplicated optical film about 125 microns thick and having diffractive surface features in the form of a negative or inverted version (negative replica) of the spiral-shaped groove pattern from the precision copper tool. The refractive index of the PET support film was about 1.49 and the refractive index of the cured acrylate resin was about 1.5. The microreplicated optical film had a transparent appearance when viewed at an angle normal to the surface of the film, with a slightly blue hue. Objects could be viewed through the film with low distortion.

Fabrication of Optical Device with Transmissive Light Redirecting Optical Element A 90 m×120 mm section of the diffractive film described above was cut out where the center of the rectangle corresponded to the center of the spiral diffractive pattern. The printed and patterned low-index layer described in Example 2 above was laminated to the non-structured side of the diffractive film with a 1 mil adhesive (3M Optically Clear Adhesive 8171). The adhesive filled the spaces between the patterned low index regions to form the variable index light extraction layer. This laminated film was further attached to a 90 mm×120 mm acrylic lightguide using an additional layer of 1 mil adhesive (3M Optically Clear Adhesive 8171). In this construction, the printed low-index layer was in between the lightguide and the surface of the diffractive film. A linear array of LEDs (Nichia, NCSL119T-H1) was then used to inject light into the edge of the acrylic lightguide, and a PROMETRIC camera (available from Radiant Imaging, Inc., Duvall, Wash. 98019) was used to evaluate the illumination device (viewing through the surface diffractive film) and the contrast between non-printed area and printed areas exhibited a contrast ratio of greater than 2:1. The illumination device was suspended over a surface at a distance of 1 foot and such that light was projected to the surface and substantially white light was observed on the surface.

The following are exemplary embodiments according to the present disclosure:

Item 1. A variable index light extraction layer, comprising
a layer having first regions comprising a first substance and second regions comprising a second substance;
wherein the first substance is a nanovoided polymeric material;
wherein the second substance is not a nanovoided polymeric material;
wherein the first region has a lower effective index of refraction than the second region; and
wherein the first and second regions of the layer are disposed such that, when optically coupled to a lightguide, the layer selectively extracts light from the lightguide based on the geometric arrangement of the first and second regions.

Item 2. The variable index light extraction layer of item 1, further comprising a substrate, wherein the substrate is disposed on a major surface of the layer.

Item 3. The variable index light extraction layer of item 2, wherein the substrate comprises a lightguide.

Item 4. The variable index light extraction layer of item 3, wherein the lightguide comprises an adhesive.

Item 5. The variable index light extraction layer of item 1, wherein the substrate comprises a reflective scattering element.

Item 6. The variable index light extraction layer of item 2, wherein the layer further comprises a plurality of optical microstructures disposed on a major surface of the layer opposite the substrate.

Item 7. The variable index light extraction layer of item 6, wherein the plurality of optical microstructures is formed from the second substance.

Item 8. The variable index light extraction layer of item 6, wherein the plurality of optical microstructures comprises a diffractive surface.

Item 9. A method of forming a variable index extraction layer, comprising
patterning a first substance on a substrate and overcoating a second substance to form a layer;
wherein first regions of the layer correspond to areas where the first substance was selectively printed and second regions of the layer correspond at least to areas between where the first substance was selectively printed;
wherein the first region has a lower effective index of refraction than the second region;
wherein the first substance is a nanovoided polymeric material;
wherein the second substance is not a nanovoided polymeric material; and
wherein the first and second regions of the layer are disposed such that the layer selectively extracts guided mode light from the substrate based on the geometric arrangement of the first and second regions.

Item 10. The method of item 9, further comprising forming a plurality of optical microstructures on a major surface of the layer opposite the substrate.

Item 11. The method of item 10, wherein forming a plurality of optical microstructures of a major surface of the layer opposite the substrate uses a cast and cure method.

Item 12. The method of item 10, wherein the plurality of optical microstructures is a diffractive surface.

Item 13. The method of item 9, wherein patterning a first substance on a substrate uses flexographic printing.

Item 14. The method of item 9, wherein patterning a first substance on a substrate uses indirect gravure printing.

Item 15. The method of item 9, wherein patterning a first substance on a substrate uses direct gravure printing.

Item 16. The method of item 9, wherein patterning a first substance on a substrate uses inkjet printing.

All U.S. patent applications and U.S. patents cited in the present application are incorporated herein by reference as if fully set forth. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A method of forming a variable index extraction layer, comprising
patterning a first substance on a substrate and overcoating a second substance to form a layer;
wherein first regions of the layer correspond to areas where the first substance was selectively printed and second regions of the layer correspond at least to areas between where the first substance was selectively printed;
wherein the first region has a lower effective index of refraction than the second region;
wherein a difference between an effective index of refraction of the first region and an effective index of refraction of the second region is greater than about 0.03;
wherein the first substance is a nanovoided polymeric material;
wherein the second substance is not a nanovoided polymeric material; and
wherein the first and second regions of the layer are disposed such that the layer selectively extracts guided mode light from the substrate based on the geometric arrangement of the first and second regions.

2. The method of claim 1, further comprising forming a plurality of optical microstructures on a major surface of the layer opposite the substrate.

3. The method of claim 2, wherein forming a plurality of optical microstructures of a major surface of the layer opposite the substrate uses a cast and cure method.

4. The method of claim 2, wherein the plurality of optical microstructures is a diffractive surface.

5. The method of claim 1, wherein patterning a first substance on a substrate uses flexographic printing.

6. The method of claim 1, wherein patterning a first substance on a substrate uses indirect gravure printing.

7. The method of claim 1, wherein patterning a first substance on a substrate uses direct gravure printing.

8. The method of claim 1, wherein patterning a first substance on a substrate uses inkjet printing.

* * * * *